(12) United States Patent
Hong et al.

(10) Patent No.: US 12,106,692 B2
(45) Date of Patent: Oct. 1, 2024

(54) WEARABLE ELECTRONIC DEVICE WITH DISPLAY

(71) Applicant: SAMSUNG ELECTRONICS CO., LTD., Suwon-si (KR)

(72) Inventors: Sungbin Hong, Suwon-si (KR); Dongok Choi, Suwon-si (KR); Heonjun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 17/749,639

(22) Filed: May 20, 2022

(65) Prior Publication Data

US 2022/0279158 A1 Sep. 1, 2022

Related U.S. Application Data

(63) Continuation of application No. PCT/KR2021/012998, filed on Sep. 24, 2021.

(30) Foreign Application Priority Data

Nov. 10, 2020 (KR) ........................ 10-2020-0149339

(51) Int. Cl.
*G09G 3/00* (2006.01)
*G09G 3/32* (2016.01)
(Continued)

(52) U.S. Cl.
CPC .............. *G09G 3/007* (2013.01); *G09G 3/36* (2013.01); *G09G 3/32* (2013.01);
(Continued)

(58) Field of Classification Search
CPC .......... G09G 3/007; G09G 2300/0491; G09G 2330/10; G09G 2340/0464; G09G 2354/00
See application file for complete search history.

(56) References Cited

U.S. PATENT DOCUMENTS 8,998,414 B2 4/2015 Bohn
10,520,732 B2 12/2019 Amitai
(Continued)

FOREIGN PATENT DOCUMENTS

KR 10-2014-0111693 9/2014
KR 10-2017-0084458 7/2017
(Continued)

*Primary Examiner* — Patrick F Marinelli
(74) *Attorney, Agent, or Firm* — Nixon & Vanderhye, P.C.

(57) ABSTRACT

A wearable electronic device with a display is provided. The wearable electronic device includes: a stereo camera configured to detect infrared light, a self-luminous display including a plurality of visible light pixels configured to output visible light corresponding to a virtual object image and a plurality of infrared pixels configured to output infrared light, an optical waveguide configured to output the virtual object image by adjusting a path of the visible light, a first control circuit configured to supply driving power and a control signal to the self-luminous display, and a second control circuit configured to supply driving power and a control signal to the stereo camera. The optical waveguide includes a half mirror configured to output reflected infrared light and transmitted infrared light in response to the output infrared light.

19 Claims, 11 Drawing Sheets

(51) Int. Cl.
*G09G 3/36* (2006.01)
*H04N 13/00* (2018.01)
(52) U.S. Cl.
CPC . *G09G 2300/0491* (2013.01); *G09G 2330/10* (2013.01); *G09G 2340/0464* (2013.01); *G09G 2354/00* (2013.01); *H04N 2013/0081* (2013.01); *H04N 2013/0096* (2013.01)

(56) References Cited

U.S. PATENT DOCUMENTS

| | | | |
|---|---|---|---|
| 10,545,340 B2 | 1/2020 | Ouderkirk et al. | |
| 10,598,939 B2 | 3/2020 | Hua et al. | |
| 11,158,126 B1* | 10/2021 | Petrov | G06F 3/012 |
| 11,164,854 B2 | 11/2021 | Chen et al. | |
| 11,715,331 B1* | 8/2023 | Fix | G06V 10/141 |
| | | | 348/78 |
| 2009/0189974 A1 | 7/2009 | Deering | |
| 2013/0077049 A1 | 3/2013 | Bohn | |
| 2017/0176749 A1 | 6/2017 | Ouderkirk et al. | |
| 2019/0235253 A1* | 8/2019 | Hua | G02B 27/017 |
| 2019/0385990 A1* | 12/2019 | Chen | G06F 1/163 |
| 2022/0107498 A1* | 4/2022 | Tu | G02B 27/0176 |
| 2022/0279158 A1* | 9/2022 | Hong | G02B 30/36 |
| 2023/0176401 A1* | 6/2023 | Shin | G02B 3/14 |
| | | | 351/239 |
| 2023/0222738 A1* | 7/2023 | Otsuka | G06T 19/006 |
| | | | 345/633 |

FOREIGN PATENT DOCUMENTS

| | | |
|---|---|---|
| KR | 10-1912958 | 10/2018 |
| KR | 10-2020-0040780 | 4/2020 |
| KR | 10-2020-0108857 | 9/2020 |
| WO | 2020/065380 | 4/2020 |

* cited by examiner

| Type | First birefringent plate 751 | First liquid crystal element 752 | Second birefringent plate 753 | Output A | Second liquid crystal element 754 | Output B | Polarizing plate 755 | Final output | Shift of final output |
|---|---|---|---|---|---|---|---|---|---|
| (1) | Input of unpolarized light | off | | 801 (801a, 801b) | on | 803 | | 807 | (0,0) |
| (2) | | off | | 801 (801a, 801b) | off | 804 | | 808 | (0.5pixel, 0.5pixel) |
| (3) | | on | | 802 (802a, 802b) | on | 805 | | 809 | (0, 0.5pixel) |
| (4) | | on | | 802 (802a, 802b) | off | 806 | | 810 | (0.5pixel, 0) |

FIG.8

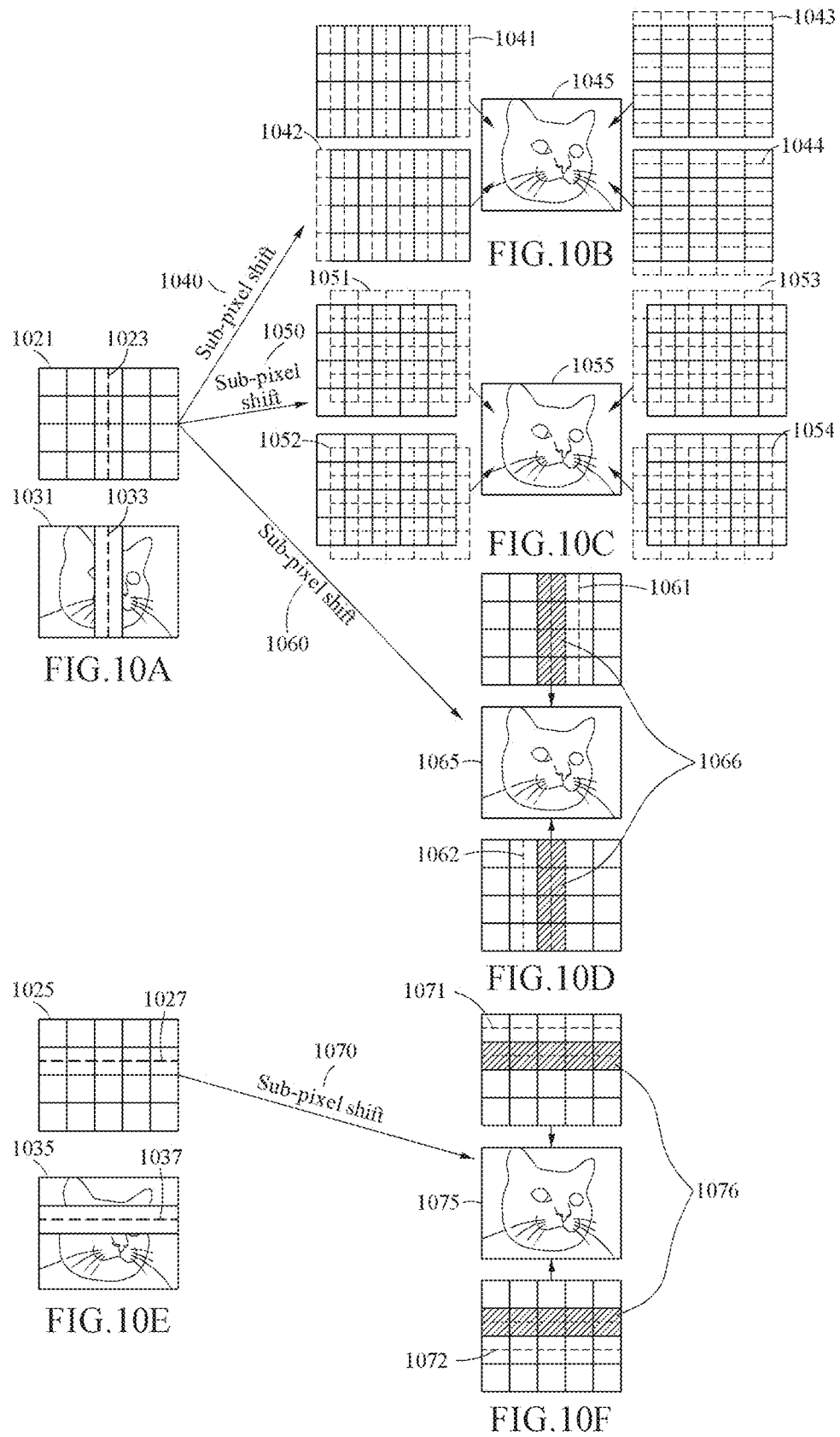

WEARABLE ELECTRONIC DEVICE WITH DISPLAY

CROSS-REFERENCE TO RELATED APPLICATIONS

This application is a continuation of International Application No. PCT/KR2021/012998 designating the United States, filed on Sep. 24, 2021, in the Korean Intellectual Property Receiving Office and claiming priority to Korean Patent Application No. 10-2020-0149339, filed on Nov. 10, 2020, in the Korean Intellectual Property Office, the disclosures of which are incorporated by reference herein in their entireties.

BACKGROUND

1. Field

The disclosure relates to a wearable electronic device including a display.

2. Description of Related Art

Recently, with a sudden growth of electronic devices such as smartphones, tablet personal computers (PCs), etc., the electronic devices enabling wireless voice calls and information exchange have become necessities of life. In the beginning, the electronic devices were recognized as portable devices simply enabling wireless calls. However, with the development of technologies and the introduction of wireless Internet, the electronic devices are developing into multimedia devices performing functions of schedule management, game, remote control, or image capturing to meet users' desires, beyond the portable devices simply enabling the wireless call.

In particular, in recent years, an electronic device providing an augmented reality (AR) service has been introduced on the market. An AR service is a service of superimposing a virtual image having supplementary information on a real-world image seen by a user and showing the superimposition result, and may provide a user with a virtual object image including content related to a real object identified from the real-world image.

A wearable electronic device may provide an augmented reality (AR) service and track a gaze of a user thereon. For example, based on the gaze of the user, a position of a virtual image may be changed, a region of interest (ROI) of the user may be identified, or an input of the user may be received through the gaze.

To track the gaze of the user, the wearable electronic device may emit infrared light toward eyes of the user and receive light reflected from the eyes. The wearable electronic device may include an infrared light emitting element for outputting infrared light, and a separate space may be required for the infrared light emitting element.

SUMMARY

Embodiments of the disclosure may provide a wearable electronic device for tracking a gaze of a user and detecting a real object using a self-luminous display including infrared pixels and using a half mirror that reflects or transmits infrared light.

Embodiments of the disclosure may provide a wearable electronic device for generating an interpolated image by outputting a plurality of adjusted images through a transparent cover including a birefringent plate, a liquid crystal element, and a polarizer, to compensate for a defective pixel.

According to an example embodiment, a wearable electronic device includes: a stereo camera configured to detect infrared light, a self-luminous display including a plurality of visible light pixels configured to output visible light corresponding to a virtual object image and a plurality of infrared pixels configured to output infrared light, an optical waveguide configured to output the virtual object image by adjusting a path of the visible light, a first control circuit configured to supply driving power and a control signal to the self-luminous display, and a second control circuit configured to supply driving power and a control signal to the stereo camera, wherein the optical waveguide includes a half mirror configured to output reflected infrared light and transmitted infrared light in response to the output infrared light.

According to an example embodiment, a wearable electronic device includes: a self-luminous display including a plurality of visible light pixels configured to output visible light corresponding to a virtual object image and a plurality of infrared pixels configured to output infrared light, a transparent cover disposed on the self-luminous display, the transparent cover including at least one birefringent plate, at least one liquid crystal element, and a polarizer, an optical waveguide disposed on the transparent cover and configured to output the virtual object image by adjusting a path of the visible light, and a first control circuit configured to supply driving power and a control signal to at least one of the self-luminous display and the at least one liquid crystal element, wherein the transparent cover is configured to output at least one adjusted image corresponding to the virtual object image by adjusting a position of the virtual light.

According to various example embodiments, a wearable electronic device may track a gaze of a user and detect a real object using a self-luminous display including an infrared pixel, and using a half mirror that reflects or transmits infrared light.

According to various example embodiments, a wearable electronic device may generate an interpolated image by outputting a plurality of adjusted images through a transparent cover including a birefringent plate, a liquid crystal element, and a polarizer, to compensate for a defective pixel.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 8 is a table illustrating light output from a transparent cover according to a control signal of a first control circuit according to various embodiments;

FIGS. 10A, 10B, 10C, 10D, 10E and 10F are diagrams illustrating adjusted images generated by a wearable electronic device according to various embodiments.

DETAILED DESCRIPTION

Figure 1:
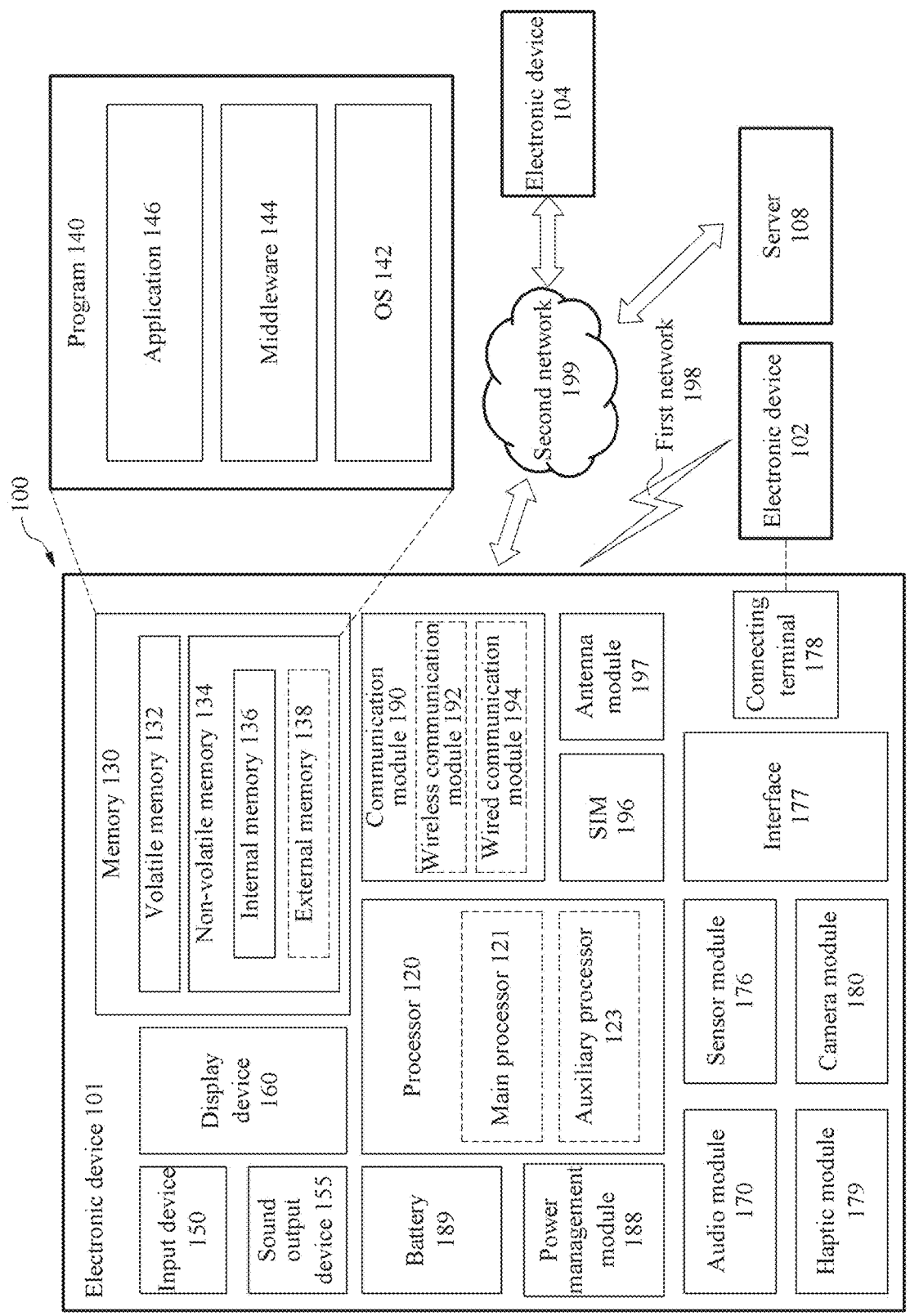
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various embodiments.

Referring to FIG. 1, an electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input device 150, a sound output device 155, a display device 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display device 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output device 155 may output a sound signal to the outside of the electronic device 101. The sound output device 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display device 160 may visually provide information to the outside (e.g., a user) of the electronic device 101. The display device 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
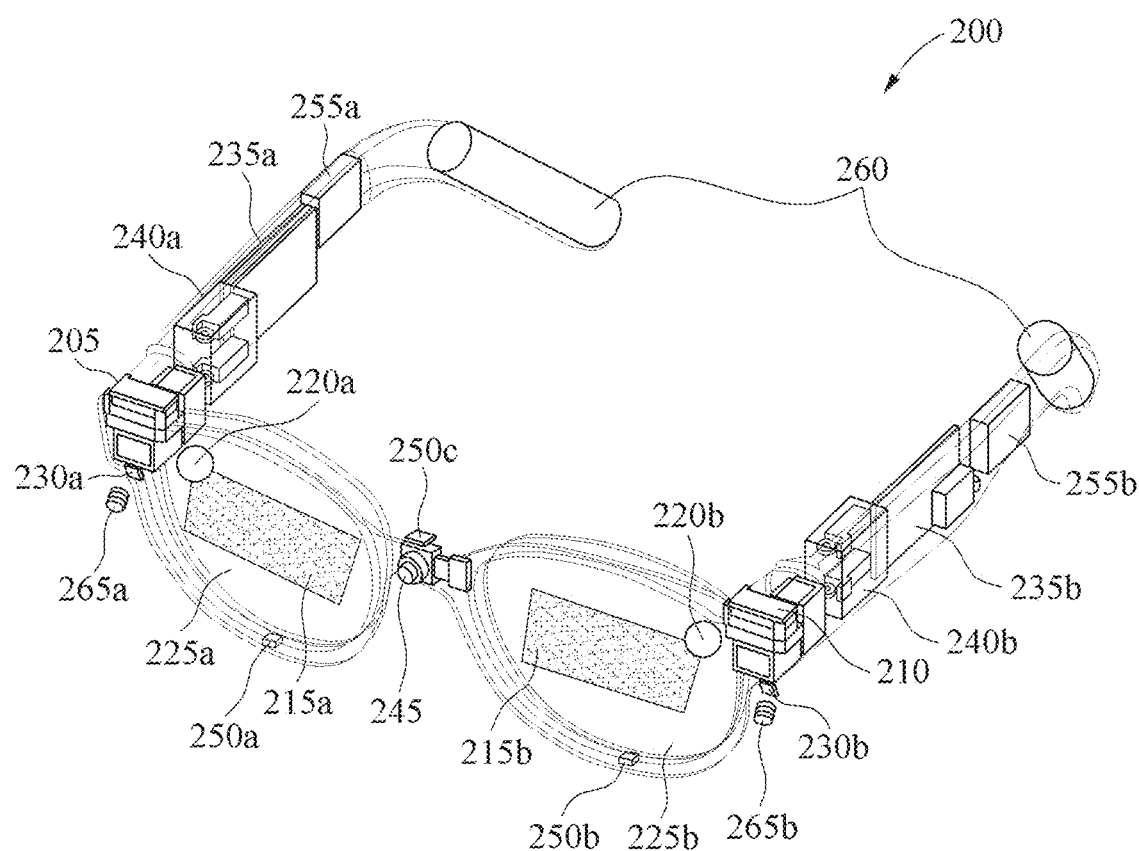
FIG. 2 is a perspective view illustrating a structure of a wearable electronic device according to various embodiments.

FIG. 2 is a diagram illustrating an example structure of a wearable electronic device according to various embodiments.

Referring to FIG. 2, a wearable electronic device 200 (e.g., the electronic device 101 of FIG. 1) may be worn on a face of a user to provide the user with an image related to an augmented reality (AR) service and/or a virtual reality (VR) service.

In an example embodiment, the wearable electronic device 200 may include a first display 205, a second display 210, screen output areas 215a and 215b, input optical members 220a and 220b, a first transparent member 225a, a second transparent member 225b, lighting units 230a and 230b, a first PCB 235a, a second PCB 235b, a first hinge 240a, a second hinge 240b, a first camera 245, a plurality of microphones (e.g., a first microphone 250a, a second microphone 250b, and a third microphone 250c), a plurality of speakers (e.g., a first speaker 255a, and a second speaker 255b), a battery 260, a second camera 265a, and a third camera 265b.

In one example embodiment, a display (e.g., the first display 205 and the second display 210) may include, for example, and without limitation, a liquid crystal display (LCD), a digital mirror device (DMD), or a liquid crystal on silicon (LCoS), an organic light-emitting diode (OLED), a micro light-emitting diode (micro LED), or the like. Although not shown, when the display is one of an LCD, a DMD, and an LCoS, the wearable electronic device 200 may include a light source configured to emit light to screen output areas (e.g., the screen output areas 215a and 215b) of the display. In an example, when the display is capable of generating light by itself, for example, when the display is either an OLED or a micro LED, the wearable electronic device 200 may provide a virtual image with a relatively high quality to the user even though a separate light source is not included. For example, when the display is implemented as an OLED or a micro LED, a light source may be unnecessary, which may lead to lightening of the wearable electronic device 200. Hereinafter, a display capable of generating light by itself may be referred to as a "self-luminous display", and description will be made on the assumption of the self-luminous display.

A display (e.g., the first display 205 and the second display 210) according to various example embodiments may include at least one micro LED. For example, the micro LED may express red (R), green (G), and blue (B) by emitting light by itself, and a single chip may implement a single pixel (e.g., one of R, G, and B pixels) because the micro LED is relatively small in size (e.g., 100 μm or less). Accordingly, it may be possible to provide a high resolution without a backlight unit (BLU) when the display is implemented as a micro LED.

However, the example embodiments are not limited thereto, and a single chip may be implemented by a plurality of pixels including R, G, and B pixels.

In an example embodiment, the display (e.g., the first display 205 and the second display 210) may include pixels for displaying a virtual image. The display may further include infrared pixels that emit infrared light.

In an example embodiment, the display may further include light-receiving pixels (e.g., photo sensor pixels) configured to receive light reflected from eyes of a user between pixels, convert the received light into electrical energy, and output the electrical energy. A light-receiving pixel may be referred to as a "gaze tracking sensor". The gaze tracking sensor may detect infrared light generated by reflecting infrared light emitted by an infrared pixel included in the display by eyes of a user.

In an example embodiment, the wearable electronic device 200 may detect a gaze direction (e.g., movement of pupils) of the user, using the light-receiving pixels. For example, the wearable electronic device 200 may detect and track a gaze direction of a right eye of the user and a gaze direction of a left eye of the user through one or more light-receiving pixels of the first display 205 and one or more light-receiving pixels of the second display 210. The wearable electronic device 200 may determine a central position of a virtual image according to the gaze directions (e.g., directions in which pupils of the right eye and the left eye of the user gaze).

In an example embodiment, the display may detect infrared light reflected by the eyes of the user through a separate gaze tracking camera (e.g., an IR LED detection sensor), instead of including light-receiving pixels.

The first display 205 and the second display 210 may each include a first control circuit (not shown). The first control circuit may control the first display 205 and the second display 210. The first control circuit may control an operation of a liquid crystal element of a transparent cover (not shown) included in each of the first display 205 and the second display 210.

In an example embodiment, light emitted from the display (e.g., the first display 205 and the second display 210) may reach the screen output area 215a formed on the first transparent member 225a that faces the right eye of the user, and the screen output area 215b formed on the second transparent member 225b that faces the left eye of the user, by passing through a lens (not shown) and a waveguide. For example, the light emitted from the display (e.g., the first display 205 and the second display 210) may be reflected from a grating area of a waveguide formed in the screen output areas 215a and 215b and the input optical members 220a and 220b, and may be transmitted to the eyes of the user. The first transparent member 225a and/or the second transparent member 225b may be formed as, for example, a glass plate, a plastic plate, or a polymer, and may be transparently or translucently formed.

In an example embodiment, a lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an example embodiment, the screen output areas 215a and 215b or a transparent member (e.g., the first transparent member 225a and the second transparent member 225b) may include a reflective lens, and a lens including a waveguide. The waveguide may be referred to as an "optical waveguide". The waveguide may be a path through which external light is incident, totally reflected, and emitted, and may be distinguished from the first transparent member 225a and the second transparent member 225b through which external light is simply reflected or transmitted.

In an example embodiment, the waveguide may be formed of glass, plastic, or a polymer, and may have a nanopattern formed on one surface of the inside or outside, for example, a grating structure of a polygonal or curved shape. According to an example embodiment, light incident to one end of the waveguide through the input optical members 220a and 220b may be propagated inside a display waveguide by the nanopattern to be provided to the user. For example, a waveguide including a freeform prism may provide incident light to a user through a reflection mirror. The waveguide may include at least one of a reflective element (e.g., a reflection mirror) and at least one diffractive element (e.g., a diffractive optical element (DOE) or a holographic optical element (HOE)). In an example embodiment, the waveguide may guide light emitted from the first display 205 and the second display 210 to the eyes of the user, using the at least one diffractive element or the reflective element included in the waveguide.

According to various example embodiments, the diffractive element may include the input optical members 220a and 220b and/or an output optical member (not shown). For example, the input optical members 220a and 220b may refer to input grating areas, and the output optical member (not shown) may refer to an output grating area. An input grating area may function as an input terminal to diffract (or reflect) light output from the display (e.g., the first display 205 and the second display 210 (e.g., a micro LED)) to transmit the light to the screen output areas 215a and 215b. The output grating area may function as an exit to diffract (or reflect) light transmitted to the waveguide to eyes of a user.

The waveguide may function as a path through which light passes. The waveguide may include the input optical members 220a and 220b and an output optical member (not shown). An area of the waveguide in which light is totally reflected may be combined with or separated from the input optical members 220a and 220b and the output optical member (not shown).

According to various example embodiments, the reflective element may include a total reflection optical element or a total reflection waveguide for total internal reflection (TIR). For example, total reflection, which is a scheme of inducing light, may form an angle of incidence to allow light (e.g., a virtual image) input through an input grating area to be 100% reflected from one surface (e.g., a specific surface) of the waveguide such that the light may be 100% propagated to an output grating area.

In an example embodiment, the light emitted from the first display 205 and the second display 210 may be guided by the waveguide through the input optical members 220a and 220b. Light traveling in the waveguide may be guided toward the eyes of the user through the output optical member. The screen output areas 215a and 215b may be determined based on light emitted toward the eyes of the user.

In an example embodiment, the first camera 245 may be referred to as a "high resolution (HR)" or a "photo video (PV)", and may include a high-resolution camera. The first camera 245 may include a color camera having functions for obtaining a high-quality image, such as an automatic focus (AF) function and an optical image stabilizer (OIS). The example embodiments are not limited thereto, and the first camera 245 may include a global shutter (GS) camera or a rolling shutter (RS) camera.

In an example embodiment, the second camera 265a and the third camera 265b may include cameras used for three degrees of freedom (3 DoF) and six degrees of freedom (6 DoF) head tracking, hand detection, tracking, gestures and/or spatial recognition. For example, the second camera 265a and the third camera 265b may each include a GS camera to detect a movement of a head or a hand and track the movement.

In an example embodiment, at least one sensor (not shown, e.g., a gyro sensor, an acceleration sensor, a geomagnetic sensor, and/or a gesture sensor), the second camera 265a, and the third camera 265b may perform at least one of head tracking for 6 DoF, pose estimation and prediction, gestures, spatial recognition, and a function of a simultaneous localization and mapping (SLAM) through depth imaging.

In an example embodiment, the second camera 265a and the third camera 265b may be classified and used as a camera for head tracking and a camera for hand tracking.

In an example embodiment, the lighting units 230a and 230b may be omitted. The lighting units 230a and 230b may be replaced by infrared pixels included in the first display 205 and the second display 210. In an example embodiment, the lighting units 230a and 230b may be included in the wearable electronic device 200 to assist infrared pixels included in the first display 205 and the second display 210. The lighting units 230a and 230b may be used differently according to positions in which the light units 230a and 230b are attached. For example, the lighting units 230a and 230b may be attached together with the second camera 265a and the third camera 265b mounted around a hinge (e.g., the first hinge 240a and the second hinge 240b) that connects a frame and a temple or around a bridge that connects frames. If capturing is performed using a GS camera, the lighting units 230a and 230b may be used to supplement a surrounding brightness. For example, the lighting units 230a and 230b may be used in a dark environment or when it is not easy to detect a subject to be captured due to reflected light and mixing of various light sources.

In an example embodiment, a second control circuit (not shown) for controlling components of the wearable electronic device 200 other than the first display 205 and the second display 210 may be located in a PCB (e.g., the first PCB 235a and the second PCB 235b). The second control circuit may control components other than the first display 205 and the second display 210 and perform an operation such as depth value estimation. The second control circuit may include a communication circuit (e.g., the communication module 190 of FIG. 1) or a memory (e.g., the memory 130 of FIG. 1). In an example embodiment, the first control circuit and the second control circuit may be integrated as a single circuit. For example, an integrated control circuit may control the first display 205, the second display, and/or the other components.

In an example embodiment, a plurality of microphones (e.g., the first microphone 250a, the second microphone 250b, and the third microphone 250c) may process an external audio signal as electrical audio data. Processed audio data may be variously utilized according to a function (or an application being executed) being performed by the wearable electronic device 200.

In an example embodiment, a plurality of speakers (e.g., the first speaker 255a and the second speaker 255b) may output audio data that is received from the communication circuit (e.g., the communication module 190 of FIG. 1) or stored in the memory (e.g., the memory 130 of FIG. 1).

In an example embodiment, one or more batteries 260 may be included and may supply power to components of the wearable electronic device 200.

Hereinafter, a structure and a light output principle of a wearable electronic device 300 will be described in detail with reference to FIGS. 3, 4A, 4B, 5, 6A, 6B, 7, 8 and 9.

Figure 3:
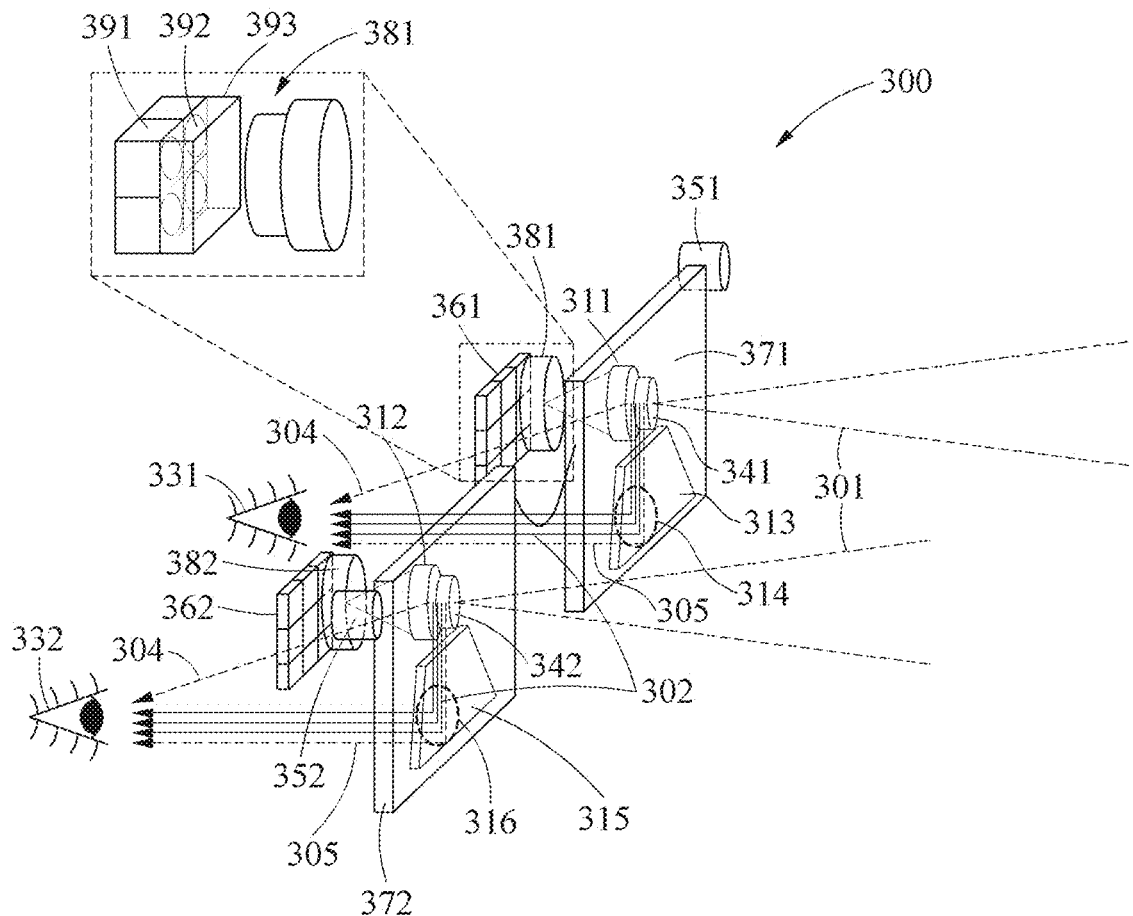
FIG. 3 is a diagram illustrating an example operation of a wearable electronic device including a half mirror according to various embodiments.

FIG. 3 is a diagram illustrating an example operation of a wearable electronic device including a half mirror according to various embodiments.

Referring to FIG. 3, the wearable electronic device 300 may include self-luminous displays 361 and 362, stereo cameras 351 and 352 (e.g., the second camera 265a and the third camera 265b of FIG. 2), optical waveguides 313 and 315, and a first control circuit (not shown, e.g., a control circuit included in each of the first display 205 and the second display 210 of FIG. 2). The optical waveguides 313 and 315 may be included in transparent members 371 and 372, respectively. The first control circuit may supply driving power and control signals to the self-luminous displays 361 and 362 (e.g., the first display 205 and the second display 210 of FIG. 2). The wearable electronic device 300 may further include a second control circuit (not shown, e.g., the first PCB 235a and the second PCB 235b of FIG. 2). The second control circuit may supply driving power and control signals to the stereo cameras 351 and 352. However, distinguishing between the first control circuit and the second control circuit is merely an example, and one control circuit may also control a self-luminous display and other components, and three or more control circuits may control components of the wearable electronic device 300.

The stereo cameras 351 and 352 may detect infrared light. In an example, the stereo cameras 351 and 352 may be disposed on a frame or temples of the wearable electronic device 300. In another example, the stereo cameras 351 and 352 may be disposed inside the transparent members 371 and 372. In this example, lenses of the stereo cameras 351 and 352 may form a portion of the transparent members 371 and 372.

The self-luminous displays 361 and 362 may each include a plurality of visible light pixels and a plurality of infrared pixels. The visible light pixels may include R, G, and B pixels. The visible light pixels may output visible light corresponding to a virtual object image. The infrared pixels may output infrared light.

A projection lens 381 may be disposed between an input optical member 311 and a micro LED 391 of the self-luminous displays 361 and 362, a transparent cover 393 may be disposed between the micro LED 391 and the projection lens 381, and a microlens 392 may be disposed between the projection lens 381 and the transparent cover 393. The microlens 392 may increase an efficiency and an intensity of light output from the micro LED 391. Partitions (not shown) may be installed between the R, G, and B pixels and may prevent light emitted from each of the R, G, and B pixels and light of a neighboring pixel from being mixed and reflected to increase an efficiency and an intensity of light passing through the microlens 392.

Infrared light output from the self-luminous displays 361 and 362 may be incident on input optical members 311 and 312, and may be separated into reflected infrared light 304 and transmitted infrared light 301 by the half mirror. The reflected infrared light 304 may be output directly toward eyes 331 and 332 of a user. Reflected infrared light 305 may also be output toward the eyes 331 and 332 through output optical members 314 and 316 by passing through the optical waveguides 313 and 315. The transmitted infrared light 301 may be output toward the real world.

The transparent members 371 and 372 may be formed as, for example, glass plates, plastic plates, or polymers, and may be transparently or translucently formed. The transparent members 371 and 372 may be disposed to face the eyes 331 and 332, respectively. The transparent members 371 and 372 may include the optical waveguides 313 and 315, respectively. The transparent members 371 and 372 may include the input optical members 311 and 312, respectively. The optical waveguides 313 and 315 are separated from the input optical members 311 and 312 as shown in FIG. 3, but this is merely an example. The input optical members 311 and 312 may also be included in the optical waveguides 313 and 315. In addition, the output optical members 314 and 316 are included in the optical waveguides 313 and 315 as shown in FIG. 3, but this is merely an example. The output optical members 314 and 316 may be separated from the optical waveguides 313 and 315. In addition, the output optical members 314 and 316 may also include the entire optical waveguides 313 and 315.

The optical waveguides 313 and 315 may output a virtual object image by adjusting a path of visible light. The optical waveguides 313 and 315 may include the output optical members 314 and 316, respectively. Visible light and infrared light output from the self-luminous displays 361 and 362 may be incident on the input optical members 311 and 312 through the microlens 392. Visible light 302 among light incident on the input optical members 311 and 312 may be totally reflected through the optical waveguides 313 and 315 to be guided to the output optical members 314 and 316. The visible light 302 may be output from the output optical members 314 and 316 toward the eyes 331 and 332.

The half mirror may be disposed in each of the input optical members 311 and 312. The half mirror may output reflected infrared light and transmitted infrared light in response to the infrared light output from the self-luminous displays 361 and 362. The half mirror may have a grating structure. The grating structure may output the reflected infrared light 304 toward the eyes 331 and 332 by reflecting a portion of the output infrared light, or may output the reflected infrared light 305 toward the eyes 331 and 332 through the output optical member 314 and 316 by passing through the optical waveguides 313 and 315. Also, the grating structure may output the transmitted infrared light 301 by transmitting another portion of the output infrared light.

The wearable electronic device 300 may perform gaze tracking using the infrared light output from the self-luminous displays 361 and 362. The wearable electronic device 300 may further include a second control circuit and a gaze tracking sensor, although not shown. The second control circuit may be included in, for example, the processor 120 of FIG. 1, or the first PCB 235a and the second PCB 235b of FIG. 2. The gaze tracking sensor may be included in the self-luminous displays 361 and 362, or included in a separate gaze tracking camera. The gaze tracking sensor may detect first reflected light that is generated by reflecting the reflected infrared light 304 from eyes of a user. The second control circuit may track a gaze of the user based on a detection result of the gaze tracking sensor.

The wearable electronic device 300 may estimate a distance to a real object, using the infrared light output from the self-luminous displays 361 and 362. The transmitted infrared light 301 may be incident on the real object and may be partially reflected from the real object. The stereo cameras 351 and 352 may detect second reflected light that is generated by reflecting the transmitted infrared light 301 from the real object. The second control circuit may estimate the distance to the real object based on detection results of the stereo cameras 351 and 352.

The second control circuit may generate a distance image indicating the estimated distance. The second control circuit may generate a composite image by synthesizing the distance image and the virtual object image. The composite image may be provided to the user through the self-luminous displays 361 and 362 and the optical waveguides 313 and 315.

The infrared pixels included in the self-luminous displays 361 and 362 may be controlled independently of visible light pixels. The first control circuit may supply or not supply driving power to the infrared pixels to control on and off operations of the infrared pixels. For example, the first control circuit may be a display driver IC (DDI). For example, in a low-illuminance environment, the infrared pixels may output infrared light to assist the stereo cameras 351 and 352 in detecting a real object. In a high-illuminance environment, driving power of the infrared pixels may be blocked, and accordingly an amount of power to be consumed by the wearable electronic device 300 may be reduced. However, this is merely an example, and the infrared pixels may be controlled under various conditions. In addition, the infrared pixels may be manually controlled by a manipulation of a user.

The wearable electronic device 300 may further include control lenses 341 and 342. The control lenses 341 and 342 may adjust an angle of view of the transmitted infrared light 301. The control lenses 341 and 342 may be disposed on the input optical members 311 and 312. The control lenses 341 and 342 may be disposed above the half mirror, in the input optical members 311 and 312. The control lenses 341 and 342 may also form a portion of the half mirror included in the input optical members 311 and 312.

The wearable electronic device 300 (e.g., the wearable electronic device 200 of FIG. 2) may provide AR to a user. The wearable electronic device 300 may provide an image representing the real world through the transparent optical waveguides 313 and 315, while transferring a virtual object image output from a display toward eyes of a user through the optical waveguides 313 and 315. Here, the wearable electronic device 300 may include AR glasses.

According to an example embodiment, the wearable electronic device 300 may output infrared light using the self-luminous displays 361 and 362 including the infrared pixels. The wearable electronic device 300 may track the gaze of the user, using the infrared light output from the self-luminous displays 361 and 362. In addition, the wearable electronic device 300 may estimate the distance to the real object, using the infrared light output from the self-luminous displays 361 and 362. Here, the self-luminous displays 361 and 362 may include, for example, micro LEDs, or OLEDs.

The wearable electronic device 300 may reflect or transmit the infrared light output from the self-luminous displays 361 and 362, through the half mirror. In an example embodiment, the wearable electronic device 300 may output the reflected infrared light 304 that is reflected by the half mirror (not shown) directly toward the eyes 331 and 332, or may output the reflected infrared light 305 passing through the optical waveguides 313 and 315 toward the eyes 331 and 332. In an example embodiment, the wearable electronic device 300 may output the transmitted infrared light 301 passing through the half mirror toward the real object.

A reflectivity and a transmittance of the half mirror may be adjusted. For example, the half mirror may have a reflectivity of 30% (e.g., reflection toward eyes of a user) and a transmittance of 70% (e.g., output toward a real object) with respect to infrared light. However, the reflectivity and the transmittance are merely examples and may be adjusted in various ratios. The half mirror may be disposed in the input optical members 311 and 312 of the optical waveguides 313 and 315. The half mirror may be disposed inside or below the input optical members 311 and 312. The half mirror may have a grating structure.

In an example embodiment, the wearable electronic device 300 may output the reflected infrared light 304 toward the eyes 331 and 332 through the half mirror and the infrared pixels included in the self-luminous displays 361 and 362. The reflected infrared light 304 may be reflected from the eyes 331 and 332, and the gaze tracking sensor (not shown) may detect the reflected light. The self-luminous displays 361 and 362 including the infrared pixels, and the half mirror included in the optical waveguides 313 and 315 may be used instead of a separate infrared light source for gaze tracking. Since the separate infrared light source is not used, the wearable electronic device 300 may be lightened and power consumption may be reduced.

In an example embodiment, the wearable electronic device 300 may output infrared light through the self-luminous displays 361 and 362 and detect light reflected from the real object through the stereo cameras 351 and 352. The wearable electronic device 300 may estimate the distance to the real object based on a detection result. For example, the wearable electronic device 300 may measure a depth value or use a time of flight (ToF) scheme to estimate the distance to the real object.

The self-luminous displays 361 and 362 including the infrared pixels, and the half mirror included in the optical waveguides 313 and 315 may be used instead of a separate infrared light source for detecting a real object. Since the separate infrared light source is not used, the wearable electronic device 300 may be lightened and power consumption may be reduced. In addition, the self-luminous displays 361 and 362 including the infrared pixels may function as auxiliary light sources to increase an accuracy of depth information and an image quality of the stereo cameras 351 and 352 in a low-illumination environment.

The wearable electronic device 300 may generate a distance image indicating the distance to the real object based on reflected light that is detected by the stereo cameras 351 and 352. The wearable electronic device 300 may output the distance image to the user. The wearable electronic device 300 may warn of a collision with the real object based on the distance image.

The wearable electronic device 300 may output the distance image together with the virtual object image. The wearable electronic device 300 may generate a composite image by synthesizing the virtual object image and the distance image. The wearable electronic device 300 may warn of the collision with the real object while providing AR to the user based on the composite image.

When the distance to the real object is less than a threshold distance, the wearable electronic device 300 may output the distance image or the composite image including the distance image. In an example, if the distance to the real object decreases, a size of the composite image may increase or an opacity of the composite image may increase. In another example, if the distance to the real object decreases, a color of the composite image may become darker.

To warn the user of the real object, the wearable electronic device 300 may output various types of notification information. The notification information may include, for example, text, an image, a warning sound, or a vibration. The wearable electronic device 300 may output a warning sound using a sound output module included in the wearable electronic device 300, or an external electronic device (e.g., a mobile terminal such as a speaker or a headphone) that is directly or wirelessly connected to the wearable electronic device 300. The wearable electronic device 300 may output an electrical stimulus or a mechanical stimulus (e.g., a vibration or a movement) that may be recognized by a user via his or her tactile sensation or kinesthetic sensation using a haptic module included in the wearable electronic device 300. Also, the wearable electronic device 300 may output an electrical stimulus or a mechanical stimulus through an external electronic device (e.g., a mobile terminal) that is directly or wirelessly connected to the wearable electronic device 300.

The control lenses 341 and 342 included in the wearable electronic device 300 may be disposed in a path through which the infrared light 301 transmitted through the half mirror passes. The control lenses 341 and 342 may adjust the angle of view of the transmitted infrared light 301 to a predetermined angle. The control lenses 341 and 342 may adjust a detectable range by adjusting the angle of view of the transmitted infrared light 301 and may adjust an intensity of light reflected from the real object.

The self-luminous displays 361 and 362 may include infrared pixels or infrared sensing pixels. Due to the infrared sensing pixels or the infrared pixels between the visible light pixels, defective pixels may be recognized by the user. Here, the infrared sensing pixels may sense infrared light reflected from human eyes, instead of a separate infrared sensing camera. Since it is impossible to detect an infrared region with the human eye, defective pixels may be generated in a virtual object image, corresponding to the infrared pixels or the infrared sensing pixels.

According to an example embodiment, the wearable electronic device 300 may include the transparent cover 393 between the self-luminous displays 361 and 362 and the optical waveguides 313 and 315. The transparent cover 393 may be disposed on the self-luminous displays 361 and 362 and below the input optical members 311 and 312. The transparent cover 393 may be disposed between the self-luminous displays 361 and 362 and the input optical members 311 and 312. The microlens 392 may be disposed next to the micro LED 391 of the self-luminous displays 361 and 362, the transparent cover 393 may be disposed next to the microlens 392, the projection lens 381 may be disposed next to the transparent cover 393, and the input optical members 311 and 312 may be disposed next to the projection lens 381. The wearable electronic device 300 may output a plurality of adjusted images by adjusting a position of a virtual object using through the transparent cover 393. The wearable electronic device 300 may shift the virtual object image in units of sub-pixels in different directions to output the plurality of adjusted images.

The transparent cover 393 may include at least one birefringent plate, at least one liquid crystal element, and/or a polarizer. The birefringent plate may separate light output from the self-emission displays 361 and 362 into ordinary rays and extraordinary rays. The liquid crystal element may change or maintain a polarization state of light based on whether power is supplied. The polarizer may perform filtering on a plurality of rays that are in different positions and/or polarization states by the birefringent plate and the liquid crystal element. The wearable electronic device 300 may control the liquid crystal element to output the plurality of adjusted images that are generated by shifting the virtual object image in units of sub-pixels in different directions.

To mitigate defective pixels, the wearable electronic device 300 may individually output the plurality of adjusted images at different timings. The wearable electronic device 300 may control the at least one liquid crystal element to individually output the plurality of adjusted images at different timings. The plurality of adjusted images flickering at different timings may be recognized by the user as a single interpolated image. Thus, the wearable electronic device 300 may mitigate defective pixels based on the plurality of adjusted images that are generated by shifting the virtual object image in units of sub-pixels.

An example of forming an interpolated image will be described in greater detail below with reference to FIGS. 7, 8, 9, 10A, 10B, 10C, 10D, 10E and 10F.

Figure 4B:
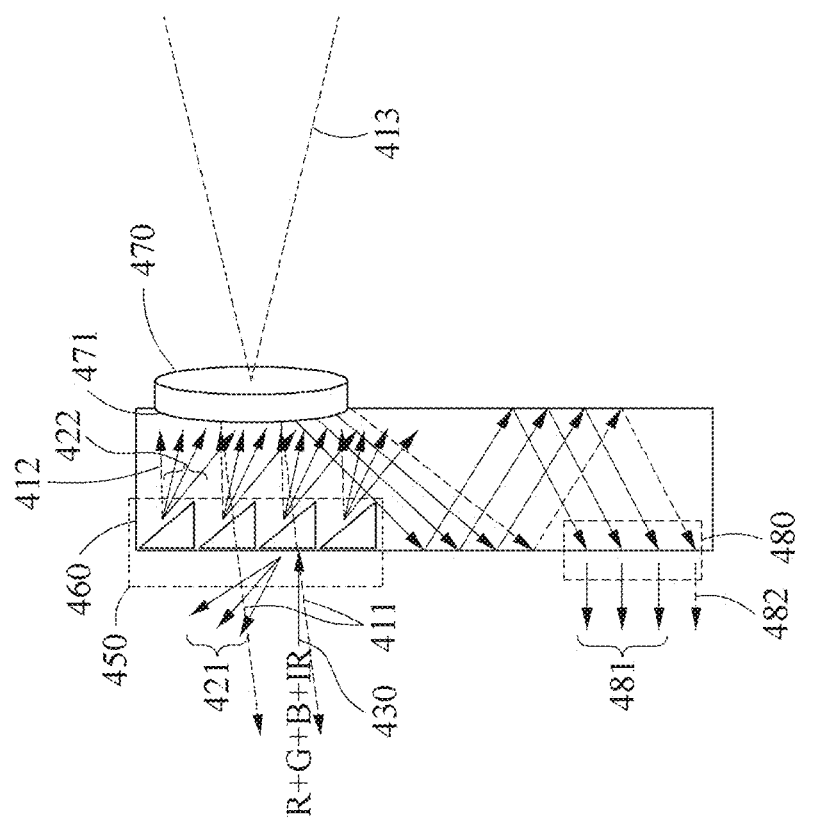
FIGS. 4A and 4B are diagrams illustrating an example structure of a half mirror and a structure of an optical waveguide according to various embodiments.
Figure 4A:
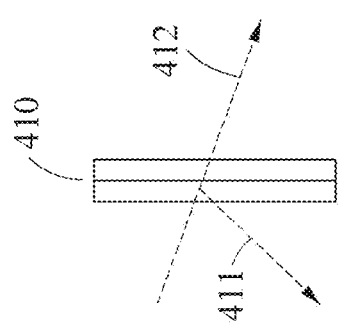

FIGS. 4A and 4B are diagrams illustrating an example structure of a half mirror and a structure of an optical waveguide according to various embodiments.

Referring to FIG. 4A, a structure of a half mirror 410 is schematically illustrated. The half mirror 410 may include two transparent layers having different refractive indices. A grating structure may be included between the two layers. In an example, the grating structure may be coated between two layers. In another example, the grating structure may form one surface of the inside or outside of a portion of one of the two layers. The grating structure may be a nanopattern and may have, for example, a polygonal or curved shape.

The half mirror 410 may be included in an optical waveguide 460 of FIG. 4B or in a control lens 470. The half mirror 410 may also be disposed on a rear surface 471 or a front surface (not shown) of the control lens 470. The half mirror 410 may be formed with a grating structure, or may be formed by a coating scheme. For example, the half mirror 410 may be coated between the optical waveguide 460 and the control lens 470.

A reflectivity of the half mirror 410 may be adjusted according to a wavelength. The half mirror 410 may have a high reflectivity with respect to visible light. For example, the half mirror 410 may have a reflectivity of 90% with respect to visible light. However, this is merely an example, and various values of the reflectivity may be set. Most visible light may be reflected by the half mirror 410 and may be totally reflected through an optical waveguide to be transferred to an output optical member.

The half mirror 410 may have an intermediate level of reflectivity for infrared light. For example, the half mirror 410 may have a reflectivity of 30% to 50% with respect to infrared light. However, this is merely an example, and various values of the reflectivity may be set. Reflected infrared light 411 that is reflected by the half mirror 410 may be output directly toward eyes of a user, or may be output, similarly to infrared light 482 of FIG. 4B, toward the eyes through an output optical member 480 by passing through the optical waveguide 460, to be detected for gaze tracking. Transmitted infrared light 412 that is transmitted by the half mirror 410 may be output toward the real world and may be detected to estimate a distance to a real object.

Referring to FIG. 4B, a structure of the optical waveguide 460 including the half mirror 410 is schematically illustrated. The optical waveguide 460 may include an input optical member 450 and the output optical member 480 (e.g., the output optical members 314 and 316 of FIG. 3). The input optical member 450 may refer to an input grating area. The input optical member 450 may function as an input terminal to diffract (or reflect) light output from a self-luminous display. The optical waveguide 460 may transfer light that is input from the input optical member 450 to the output optical member 480 through a total reflection. The output optical member 480 may refer to an output grating area. The output optical member 480 may function as an exit to diffract (or reflect) light transferred through a total reflection waveguide to eyes of a user.

The input optical member 450 may include the half mirror 410. The half mirror 410 may be formed in an entire area or a partial area of the input optical member 450. If the half mirror 410 is formed in the entire area of the input optical member 450, the input optical member 450 may also be referred to as the "half mirror 410".

Hereinafter, it is assumed that mixed light 430 obtained by combining visible light and infrared light is output by the self-luminous display for explanation, however, the visible light and the infrared light may be independently output. In addition, red, blue and green rays included in the visible light may be independently output.

The self-luminous display may output the mixed light 430 to the input optical member 450. By the half mirror 410 included in the input optical member 450, visible light 421 that is a portion of the visible light may be reflected, and visible light 422 that is another portion of the visible light may be transmitted into the optical waveguide 460. The mixed light 430 output by the self-luminous display may be incident to the optical waveguide 460 through the input optical member 450. The visible light 422 incident on the input optical member 450 may be totally reflected in the optical waveguide 460 and may be output to the outside through the output optical member 480. A portion of infrared light 412 incident on the optical waveguide 460 may be reflected by the half mirror 410. Infrared light that is a portion of the reflected infrared light 411 may be output directly toward the eyes of the user. Infrared light 482 that is another portion of the reflected infrared light 411 may be totally reflected in the optical waveguide 460 and may be output to the outside through the output optical member 480. Infrared light 413 that is another portion of the infrared light 412 incident on the optical waveguide 460 may be output toward the real object by passing through the half mirror 410.

The reflected visible light 421 may be minimized and/or reduced to protect the eyes of the user. For example, the reflected visible light 421 may correspond to 10% of the visible light in the mixed light 430, and the visible light 422 transmitted through the input optical member 450 may correspond to 90% of the visible light in the mixed light 430, however, this is merely an example. The visible light 421 may be adjusted to a minimum level to protect the eyes of the user. The infrared light 411 that is a portion of the infrared light in the mixed light 430 may be reflected by the half mirror 410, and the infrared light 412 that is another portion of the infrared light may be transmitted into the optical waveguide 460. Here, the reflected infrared light 411 may be minimized and/or reduced to protect the eyes of the user. For example, the infrared light 411 and the infrared light 412 may correspond to 30% and 70% of the infrared light in the mixed light 430, respectively, however, this is merely an example. The infrared light 411 may be adjusted to a minimum level to protect the eyes of the user.

A reflectivity of the input optical member 450 with respect to incident light may be controlled, or the incident optical member 450 may be designed to allow light to be directed into the optical waveguide 460, and accordingly the infrared light 411 and the visible light 421 reflected directly from the input optical member 450 toward the eyes may be minimized and/or reduced.

The visible light 422 may be totally reflected inside the optical waveguide 460. The optical waveguide 460 may transfer the visible light 422 to the output optical member 480.

The output optical member 480 may output the visible light 422 to the outside of the optical waveguide 460. Output visible light 481 may correspond to a virtual object image, and the user may experience the virtual object image.

Infrared light reflected by the half mirror 410 may be output directly toward the eyes of the user, similarly to the infrared light 411, or may be output through the output optical member 480 by passing through the optical waveguide 460, similarly to the infrared light 482. The infrared light 411 or 482 may be reflected from the eyes of the user, and the reflected light may be detected by a gaze tracking sensor. A detection result may be used to track a gaze of the user. Accordingly, a separate infrared light source for gaze tracking may not be required due to the half mirror 410. Since the separate infrared light source is not used, a wearable electronic device may be lightened and power consumption may be reduced.

The infrared light 412 transmitted through the half mirror 410, except for the infrared light 411 reflected toward the eyes by the half mirror 410, may be output to the outside of the optical waveguide 460. The rear surface 471 onto which the infrared light 412 transmitted through the input optical member 450 is first incident may be coated to reflect the visible light 422, to totally reflect the visible light 422 through the optical waveguide 460 and to transmit a portion of the infrared light 412 to the outside. For example, the rear surface 471 may have a grating structure to transmit a portion of the infrared light 412 to the outside.

The infrared light 413 transmitted through the optical waveguide 460 may pass through the control lens 470. The control lens 470 may adjust an angle of view of the infrared light 413 to a predetermined angle. The control lens 470 may adjust an intensity and a detectable range of light reflected from a real object to be suitable for detection of the real object, by adjusting the angle of view of the infrared light 413.

Figure 5:
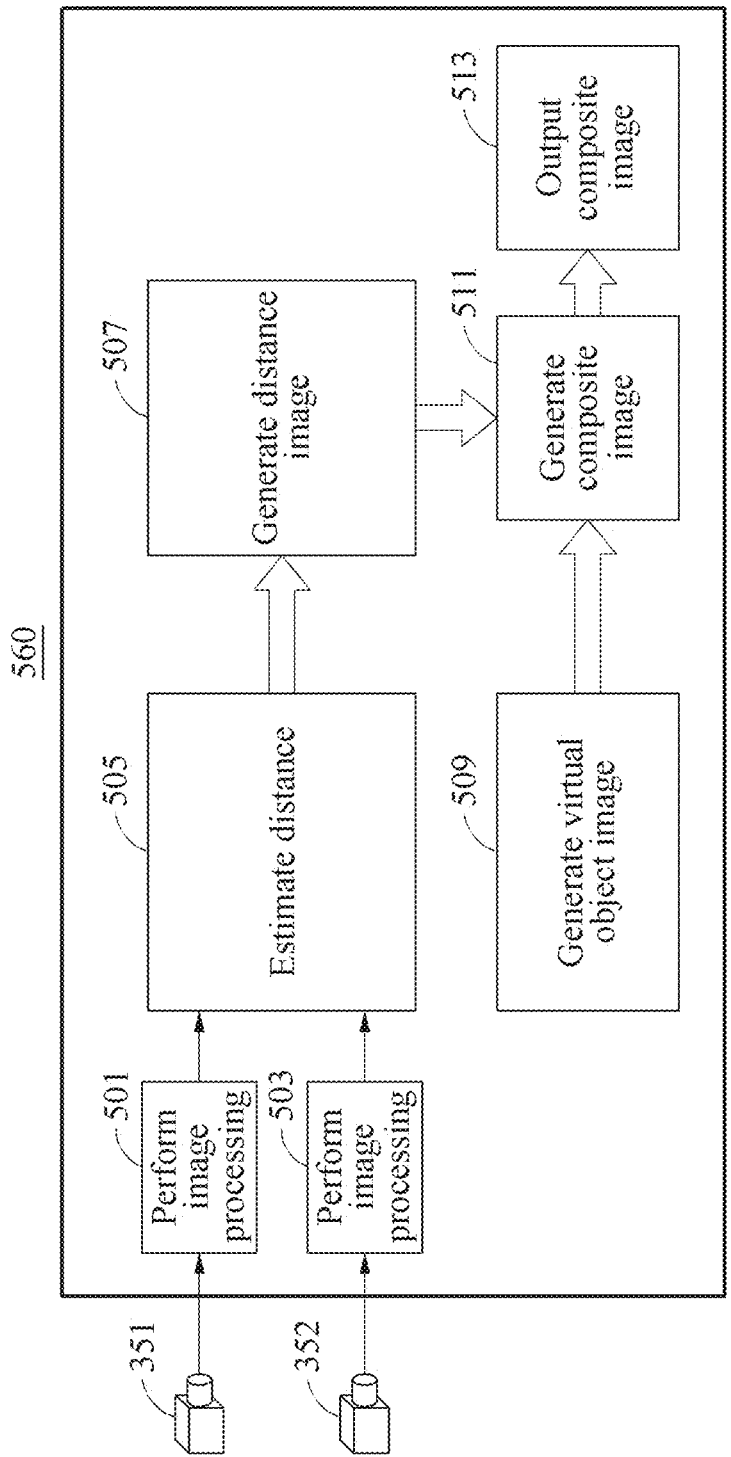
FIG. 5 is a diagram illustrating an example operation of a second control circuit of a wearable electronic device according to various embodiments.

FIG. 5 is a diagram illustrating an example operation of a second control circuit of a wearable electronic device according to various embodiments.

According to an example embodiment, the wearable electronic device may include a second control circuit 560 and stereo cameras 351 and 352. The second control circuit 560 may estimate a distance to a real object based on detection results of the stereo cameras 351 and 352.

The infrared light 413 of FIG. 4B transmitted toward the real world may be incident on the real object. The infrared light 413 may be reflected from the real object, and the stereo cameras 351 and 352 may detect the reflected light. The stereo cameras 351 and 352 may detect visible light as well as infrared light. The stereo cameras 351 and 352 may capture the real object from different viewpoints.

In operations 501 and 503, the second control circuit 560 may perform image processing on images acquired by the stereo cameras 351 and 352. In operation 505, the second control circuit 560 may estimate the distance to the real object based on image processing results. For example, the second control circuit 560 may measure a depth value or use a ToF scheme, to estimate the distance to the real object.

In operation 507, the second control circuit 560 may generate a distance image indicating the estimated distance. For example, the distance image may include numerical data indicating the distance and a unit according, for example, to a metric system. The distance image may further include a masking image or an outline image of an area of the real object. A color or brightness of the distance image may be determined to be contrasted with a background.

In operation 509, the second control circuit 560 may generate a virtual object image. For example, the virtual object image may be generated based on images captured by the stereo cameras 351 and 352 and/or a first camera (e.g., the first camera 245 of FIG. 2).

In operation 511, the second control circuit 560 may generate a composite image. The second control circuit 560 may generate the composite image by synthesizing the distance image generated in operation 507 and the virtual object image generated in operation 509.

In operation 513, the second control circuit 560 may output the composite image to a user, using a self-luminous display (e.g., the self-luminous displays 361 and 362 of FIG. 3) and an optical waveguide.

Figure 6A:
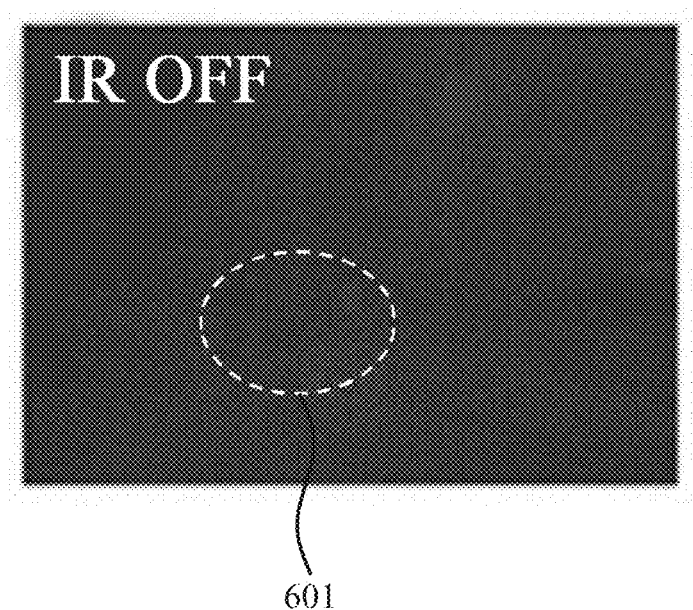
FIGS. 6A and 6B are diagrams illustrating examples of distance images output by a wearable electronic device according to various embodiments.
Figure 6B:
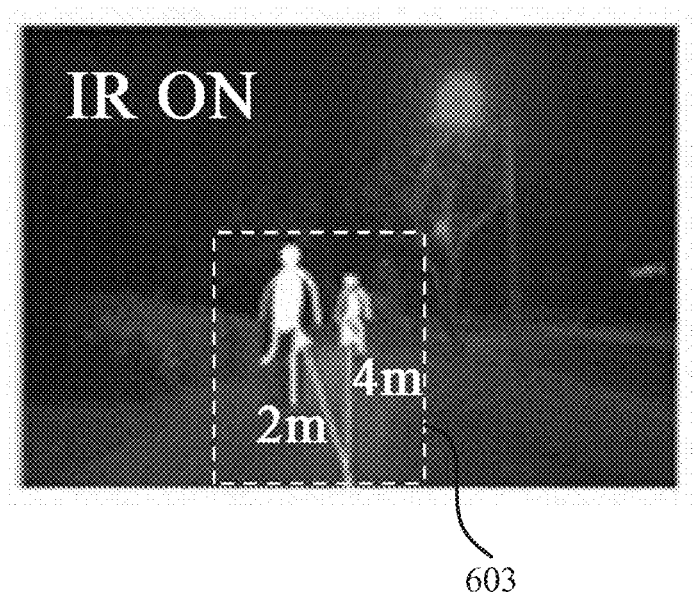

FIGS. 6A and 6B are diagrams illustrating examples of distance images output by a wearable electronic device according to various embodiments.

Two stereo cameras (e.g., the stereo cameras 351 and 352 of FIG. 3) may be disposed in different positions of a wearable electronic device (e.g., the wearable electronic device 300 of FIG. 3). The wearable electronic device may calculate a depth value by matching images captured by the respective stereo cameras based on a binocular disparity characteristic. The wearable electronic device may calculate a distance to a real object based on the depth value.

To operate the above stereo cameras, an illuminance level greater than or equal to a predetermined level may be required. Due to an insufficient amount of light in a low-illuminance environment, it may be difficult to calculate the depth value. An infrared pixel of the wearable electronic device may output infrared light to the outside of the wearable electronic device in the low-illuminance environment to assist the stereo cameras in detecting the real object. The wearable electronic device may control on and off operations of an infrared pixel included in a self-luminous display (e.g., the self-luminous displays 361 and 362 of FIG. 3).

FIG. 6A illustrates an image captured when the infrared pixel of the self-luminous display is turned off in a low-illuminance environment. A real object 601 (e.g., two persons) may exist in front of the wearable electronic device. However, if an auxiliary light source is absent in the low-illuminance environment, the stereo cameras may not clearly capture the real object.

FIG. 6B illustrates a situation in which the infrared pixel of the self-luminous display is turned on in the low-illuminance environment. The infrared pixel may function as an auxiliary light source and may provide a sufficient amount of light to the stereo cameras. Infrared light output by the infrared pixel may be emitted to a real object (e.g., two persons), and infrared light reflected from the real object may be detected by the stereo cameras.

The wearable electronic device may perform image processing on the images captured by the respective stereo cameras, and may estimate a distance to the real object based on image processing results. The wearable electronic device may match the above two images and may calculate a depth value based on a matching result. The wearable electronic device may estimate the distance to the real object based on the depth value.

The wearable electronic device may generate a distance image 603 indicating the distance (e.g., 2 meters (m) and 4 m) to the real object. The distance image 603 may include a masking image of an area of the real object. Thus, the real object may be clearly identified in the low-illuminance environment, and a user may not collide with the real object.

Figure 7:
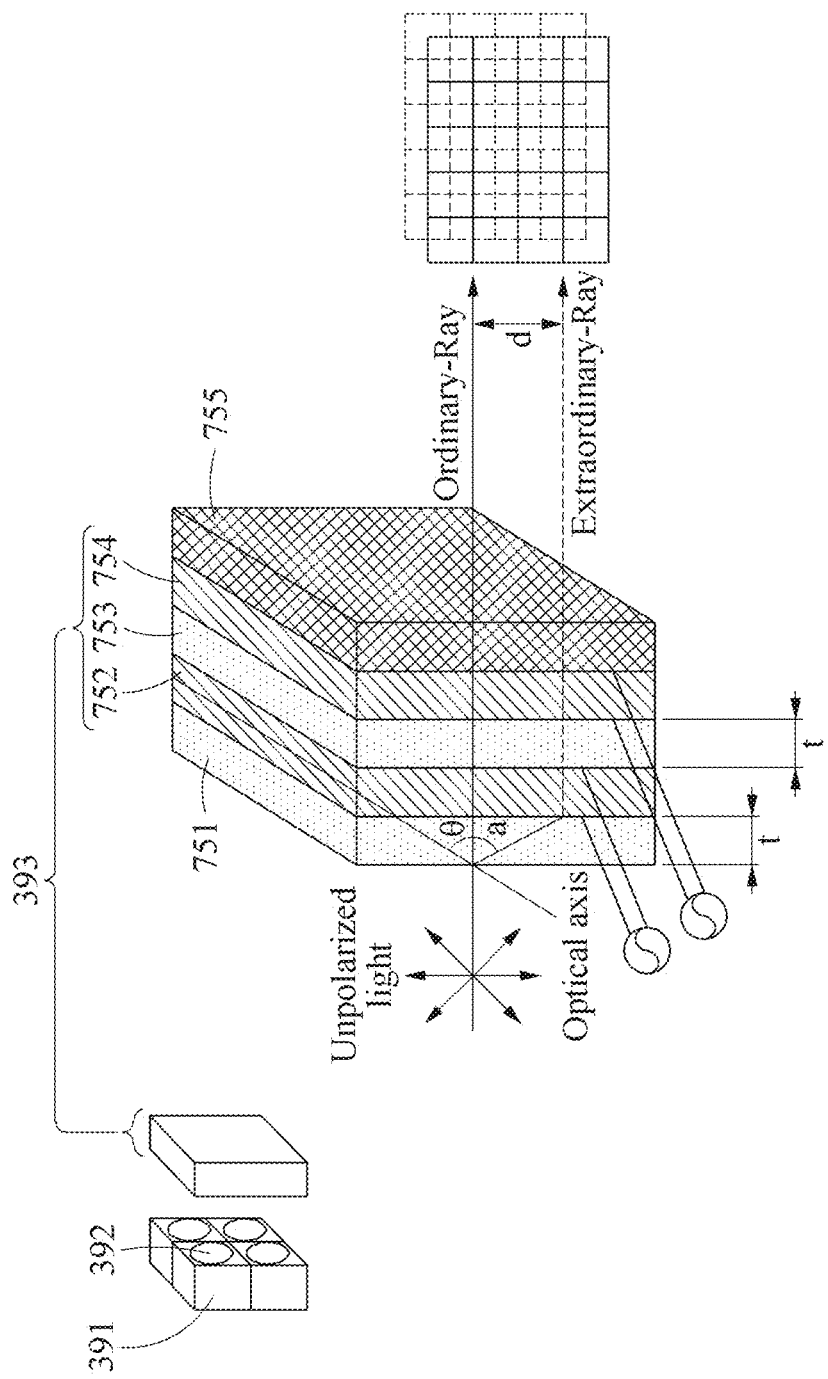
FIG. 7 is a diagram illustrating an example structure of a transparent cover included in a wearable electronic device according to various embodiments.

FIG. 7 is a diagram illustrating an example structure of a transparent cover included in a wearable electronic device according to various embodiments.

According to an example embodiment, the wearable electronic device may include a self-luminous display (e.g., the self-luminous displays 361 and 362 of FIG. 3), a transparent cover 393, an optical waveguide (e.g., the optical waveguides 313 and 315 of FIG. 3), and a first control circuit (not shown, e.g., a control circuit included in each of the first display 205 and the second display 210 of FIG. 2). The self-luminous display may include a plurality of visible light pixels that emit visible light corresponding to a virtual object image, and a plurality of infrared pixels that emit infrared light. The self-luminous display may include a micro LED 391 and a microlens 392. The transparent cover 393 may be disposed on the self-luminous display and may include at least one birefringent plate, at least one liquid crystal element, and a polarizer. The optical waveguide may be disposed on the transparent cover 393 and may output a virtual object image by adjusting a path of visible light. The first control circuit may supply driving power and a control signal to at least one of the self-luminous display and the at least one liquid crystal element.

The wearable electronic device may output a plurality of adjusted images by adjusting a position of the virtual object image through the transparent cover 393. The wearable electronic device may shift the virtual object image in units of sub-pixels in different directions to output the plurality of adjusted images.

In the wearable electronic device, the transparent cover 393 may be disposed between the self-luminous display and the optical waveguide. An area of the transparent cover 393 may substantially overlap an area in which the plurality of infrared pixels are disposed in the self-luminous display. The transparent cover 393 may be disposed in an entire area or a partial area of the optical waveguide that covers the area in which the plurality of infrared pixels are disposed.

The transparent cover 393 may include at least one birefringent plate, at least one liquid crystal element, and/or a polarizer. For example, the transparent cover 393 may include a first birefringent plate 751, a first liquid crystal element (e.g., including a liquid crystal material) 752, a second birefringent plate 753, a second liquid crystal element (e.g., including a liquid crystal material) 754, and a polarizing plate 755. The first liquid crystal element 752 may be disposed between the first birefringent plate 751 and the second birefringent plate 753. The second birefringent plate 753 may be disposed between the first liquid crystal element 752 and the second liquid crystal element 754. The second liquid crystal element 754 may be disposed between the second birefringent plate 753 and the polarizing plate 755. The polarizing plate 755 may be disposed next to the second liquid crystal element 754. However, this is merely an example, and a number and/or a stacking sequence of components of the transparent cover 393 is not limited thereto.

Referring to FIG. 7, unpolarized light that is emitted from the self-luminous display may be incident on the transparent cover 393 to be output without a change, or may be vertically or horizontally moved to be output. For example, when unpolarized light is transmitted through the first birefringent plate 751, the first liquid crystal element 752, the second birefringent plate 753, the second liquid crystal element 754, and the polarizing plate 755 in the transparent cover 393, the unpolarized light may be output in a state of being incident without a change, or may travel in parallel to be output.

When the unpolarized light is incident on the first birefringent plate 751, the first birefringent plate 751 may separate the incident light into an ordinary ray that is not refracted and is output and an extraordinary ray that is refracted and output. In this example, a separation width of rays may be adjusted according to a material and/or a shape of the first birefringent plate 751. A thickness t of the first birefringent plate 751, an ordinary ray refractive index, and/or an extraordinary ray refractive index may be adjusted such that a separation width d of the ordinary ray and the extraordinary ray may be identical to a size of a sub-pixel. The size of the sub-pixel may refer to a size less than a size of one pixel, and may be, for example, ½ of the size of the pixel.

The ordinary ray and the extraordinary ray passing through the first birefringent plate 751 may be incident on the first liquid crystal element 752 located adjacent to the first birefringent plate 751. In this example, the first liquid crystal element 752 may change a polarization state of incident light according to a control signal supplied from the first control circuit (not shown). For example, the first liquid crystal element 752 may rotate a polarization direction of the incident light based on the control signal supplied from the first control circuit. For example, when power is supplied to the first liquid crystal element 752, the incident light may be output without a change. When power is not supplied to the first liquid crystal element 752, the polarization direction of the incident light may be rotated and the incident light may be output.

Light passing through the first liquid crystal element 752 may be incident on the second birefringent plate 753 located adjacent to the first liquid crystal element 752. In this case, similarly to the first birefringent plate 751, a thickness t of the second birefringent plate 753, the ordinary ray refractive index, and/or the extraordinary ray refractive index may be adjusted such that the separation width d of the ordinary ray and the extraordinary ray may be identical to ½ of a size of a pixel. Although only two rays separated by the first birefringent plate 751 are illustrated for convenience in the example of FIG. 7, the separated rays may be separated once more while passing through the second birefringent plate 753.

Light passing through the second birefringent plate 753 may be incident on the second liquid crystal element 754 located adjacent to the second birefringent plate 753. In this example, similarly to the first liquid crystal element 752, the second liquid crystal element 754 may change a polarization state of the incident light according to the control signal supplied from the first control circuit. For example, the second liquid crystal element 754 may rotate a polarization direction of the incident light based on the control signal supplied from the first control circuit. For example, when power is supplied to the second liquid crystal element 754, the incident light may be output without a change. When power is not supplied to the second liquid crystal element 754, the polarization direction of the incident light may be rotated and the incident light may be output.

Light passing through the second liquid crystal element 754 may be incident on the polarizing plate 755 located adjacent to the second liquid crystal element 754. The polarizing plate 755 outputs only the same component as a polarization direction of the polarizing plate 755 among the incident light. Accordingly, a final output may be determined by the polarizing plate 755. The transparent cover 393 may output adjusted images that are generated by shifting the virtual object image by sub-pixels in four different directions.

Four adjusted images may flicker at different timings. Frames generated by horizontally and/or vertically shifting frames of the original image according to control signals supplied to the first liquid crystal element 752 and the second liquid crystal element 754 may periodically flicker at different timings. The four adjusted images may be output in synchronization with each other to provide a virtual pixel according to an interpolation principle. Accordingly, defective pixels due to infrared pixels may be offset or cancelled.

In addition, when the four adjusted images flicker at a frequency higher than an output frequency of the original image, a resolution of an interpolated image may be greater than a resolution of the original image.

FIG. 8 is a table illustrating example light output from a transparent cover based on a control signal of a first control circuit according to various embodiments.

According to an example embodiment, the first liquid crystal element 752 may output incident light without a change, or may operate as a quarter-wave plate to change the incident light to circularly polarized light and to output the circularly polarized light, according to a control signal supplied by a first control circuit (not shown, e.g., a control circuit in each of the first display 205 and the second display 210 of FIG. 2). For example, the first liquid crystal element 752 may determine whether light to be output is to be rotated by a quarter of a wavelength, based on the control signal. According to an example embodiment, when power is not supplied to the first liquid crystal element 752, the first liquid crystal element 752 may function as a quarter-wave plate. When power is supplied to the first liquid crystal element 752, the first liquid crystal element 752 may output light without a change, instead of changing a polarization direction of the light. When power is not supplied to the first liquid crystal element 752, the first liquid crystal element 752 may output circularly polarized light by rotating the polarization direction of the light by a quarter of a wavelength.

In an example, when unpolarized light that is emitted by a self-luminous display (e.g., the self-luminous displays 361 and 362 of FIG. 3) is incident on the first birefringent plate 751 (e.g., a birefringent plate with an angle of a cutting plane of "0" degrees), the unpolarized light may be separated into an ordinary ray that is not refracted and is output according to an ordinary ray refractive index and an extraordinary ray that is horizontally refracted and is output according to an extraordinary ray refractive index. In this example, the ordinary ray may be perpendicular to an optical axis, the extraordinary ray may be parallel to the optical axis, and the ordinary ray and the extraordinary ray may be light polarized in different directions, that is, directions perpendicular to each other.

In another example, when unpolarized light is incident on the second birefringent plate 753 (e.g., a birefringent plate with an angle of a cutting plane of "90" degrees), the unpolarized light may be separated into an ordinary ray that is not refracted and is output according to the ordinary ray refractive index and an extraordinary ray that is vertically refracted and is output according to the extraordinary ray refractive index. In this example, the ordinary ray may be perpendicular to the optical axis, the extraordinary ray may be parallel to the optical axis, and the ordinary ray and the extraordinary ray may be light polarized in different directions, that is, directions perpendicular to each other.

According to an example embodiment, the ordinary ray output when the unpolarized light is incident on the first birefringent plate 751 and the ordinary ray output when the unpolarized light is incident on the second birefringent plate 753 may be polarized in directions that are perpendicular to each other. The extraordinary ray output when the unpolarized light is incident on the first birefringent plate 751 and the extraordinary ray output when the unpolarized light is incident on the second birefringent plate 753 may be polarized in directions that are perpendicular to each other.

When the unpolarized light is incident on the first birefringent plate 751, the unpolarized light may be separated into an ordinary ray that is polarized light with a vertical component and an extraordinary ray that is polarized light with a horizontal component. The ordinary ray and the extraordinary ray may be incident on the first liquid crystal element 752. When power is supplied to the first liquid crystal element 752 by the control signal supplied by the first control circuit, the light incident on the first liquid crystal element 752 to which the power is supplied may be output without a change, instead of changing the polarization direction.

The polarized light (e.g., an ordinary ray) with the vertical component and the polarized light (e.g., an extraordinary ray) with the horizontal component which pass through the first liquid crystal element 752 without a change may be incident on the second birefringent plate 753. When the polarized light with the vertical component passes through the second birefringent plate 753, the polarized light may be refracted by the second birefringent plate 753 to be output as an extraordinary ray. For example, since there is no horizontal component in the polarized light with the vertical component that is incident on the second birefringent plate 753, horizontally polarized light (e.g., an ordinary ray) that is not refracted by the second birefringent plate 753 and is output may be absent. When the polarized light with the horizontal component passes through the second birefringent plate 753, the polarized light may not be refracted by the second birefringent plate 753 to be output as an ordinary ray without a change. For example, since there is no vertical component in the polarized light with the horizontal component that is incident on the second birefringent plate 753, vertically polarized light (e.g., an extraordinary ray) that is refracted by the second birefringent plate 753 and is output may be absent.

When the unpolarized light is incident on the first birefringent plate 751, the unpolarized light may be separated into an ordinary ray that is polarized light with a vertical component and an extraordinary ray that is polarized light with a horizontal component. The ordinary ray and the extraordinary ray may be incident on the first liquid crystal element 752. When power is not supplied to the first liquid crystal element 752 by the control signal supplied by the first control circuit, a polarization direction of light incident on the first liquid crystal element 752 to which power is not supplied may be rotated by a quarter of a wavelength and may be output as circularly polarized light. According to an example embodiment, circularly polarized light output while vertically polarized light (e.g., an ordinary ray) is passing through the first liquid crystal element 752, and circularly polarized light output while horizontally polarized light (e.g., an extraordinary ray) is passing through the first liquid crystal element 752 may have different phases.

According to an example embodiment, the above two circularly polarized lights passing through the first liquid crystal element 752 may be incident on the second birefringent plate 753. According to an example embodiment, circularly polarized light may be separated into polarized light with a vertical component and polarized light with a horizontal component according to a phase at a point in time at which the circularly polarized light is incident on the second birefringent plate 753 and may be output. For example, the circularly polarized light may be separated into horizontally polarized light (e.g., an ordinary ray) that is not refracted and vertically polarized light (e.g., an extraordinary ray) that is refracted, according to the phase at the point in time at which the circularly polarized light is incident on the second birefringent plate 753 and may be output.

Referring to FIG. 8, when power is not supplied to the first liquid crystal element 752, an output 801 may include light 801a that is not output and light 801b that is output, by adjusting the phase at the point in time at which the circularly polarized light is incident on the second birefringent plate 753. When power is supplied to the first liquid crystal element 752, an output 802 may include light 802a that is not output and light 802b that is output.

According to an example embodiment, an output A (e.g., the outputs 801 and 802) may be incident on the second liquid crystal element 754, and the second liquid crystal element 754 may output incident light without a change, or may output the incident light by rotating the incident light by about 90 degrees, according to the control signal of the first control circuit. For example, the second liquid crystal element 754 may determine whether light to be output is to be rotated by about 90 degrees based on the control signal. According to an example embodiment, when power is not supplied to the second liquid crystal element 754, the second liquid crystal element 754 may function as a half-wave plate. When power is supplied to the second liquid crystal element 754, the second liquid crystal element 754 may output light without a change, instead of changing a polarization direction of the light. When power is not supplied to the second liquid crystal element 754, the second liquid crystal element 754 may rotate the polarization direction of the light by about 90 degrees and may output the light.

Referring to type (1) of FIG. 8, the output 801 (or light of the output 801) may be incident on the second liquid crystal element 754 to which power is supplied, and may be output as, e.g., an output 803, instead of being rotated, while passing through the second liquid crystal element 754. The output 803 may be incident on the polarizing plate 755 in a horizontal direction, and only light (e.g., the same light as the polarization direction of the polarizing plate 755) corresponding to the polarization direction of the polarizing plate 755 among a plurality of rays of the output 803 may be output as, e.g., an output 807, while passing through the polarizing plate 755.

Referring to type (2) of FIG. 8, the output 801 (or the light of the output 801) may be incident on the second liquid crystal element 754 to which power is not supplied, may be rotated by about 90 degrees while passing through the second liquid crystal element 754 and may be output as, e.g., an output 804. The output 804 may be incident on the polarizing plate 755 in the horizontal direction, and only light (e.g., the same light as the polarization direction of the polarizing plate 755) corresponding to the polarization direction of the polarizing plate 755 among a plurality of rays of the output 804 may be output as, e.g., an output 808, while passing through the polarizing plate 755.

Referring to type (3) of FIG. 8, the output 802 (or light of the output 802) may be incident on the second liquid crystal element 754 to which power is supplied, and may be output as, e.g., an output 805, instead of being rotated, while passing through the second liquid crystal element 754. The output 805 may be incident on the polarizing plate 755 in the horizontal direction, and only light (e.g., the same light as the polarization direction of the polarizing plate 755) corresponding to the polarization direction of the polarizing plate 755 among a plurality of rays of the output 805 may be output as, e.g., an output 809, while passing through the polarizing plate 755.

Referring to type (4) of FIG. 8, the output 802 (or the light of the output 802) may be incident on the second liquid crystal element 754 to which power is not supplied, may be rotated by about 90 degrees while passing through the second liquid crystal element 754 and may be output as, e.g., an output 806. The output 806 may be incident on the polarizing plate 755 in the horizontal direction, and only light (e.g., the same light as the polarization direction of the polarizing plate 755) corresponding to the polarization direction of the polarizing plate 755 among a plurality of rays of the output 806 may be output as, e.g., an output 810, while passing through the polarizing plate 755.

According to an example embodiment, the output 807 of type (1) of FIG. 8 may be an output in which light output from a micro LED (e.g., the micro LED 391 of FIG. 3) itself is not shifted, and the output 808 of type (2) of FIG. 8 may be an output generated by vertically and horizontally shifting the light output from the micro LED by ½ of a size of a pixel. The output 809 of type (3) of FIG. 8 may be an output generated by horizontally shifting the light output from the micro LED by ½ of the size of the pixel, and the output 810 of type (4) of FIG. 8 may be an output generated by vertically shifting the light output from the micro LED by ½ of the size of the pixel.

Figure 9:
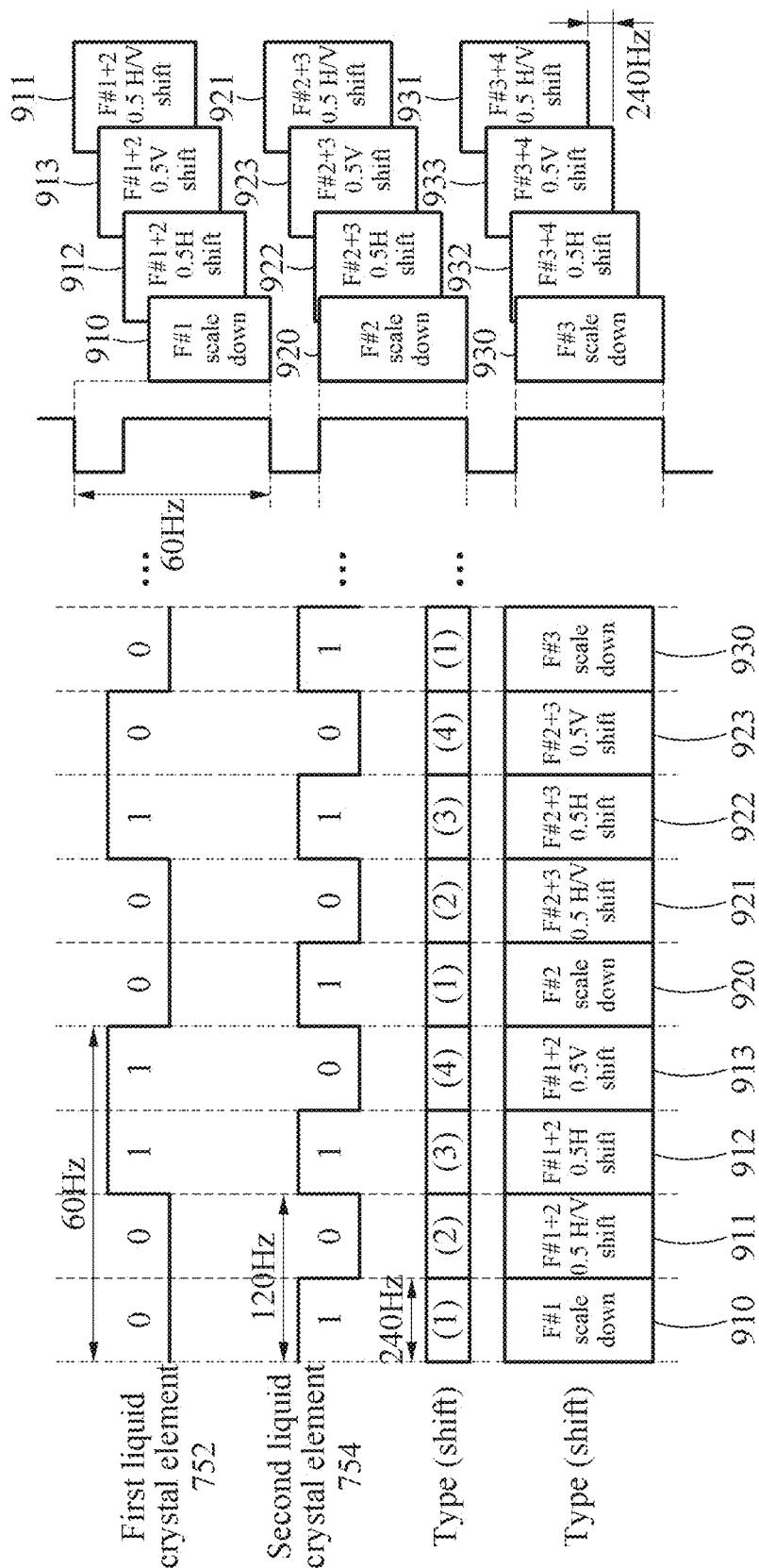
FIG. 9 is a diagram illustrating an example configuration of an image output passing through a transparent cover according to various embodiments.

FIG. 9 is a diagram illustrating an example configuration of an image output passing through a transparent cover according to various embodiments.

Referring to FIG. 9, the original image (not shown) may be output at a speed of 60 Hz, and frames 911, 912, 913, 921, 922, 923, 931, 932, and 933 generated by horizontally and/or vertically shifting frames of the original image according to control signals supplied to the first liquid crystal element 752 and the second liquid crystal element 754 may be output at a speed of 240 Hz. Also, frames 910, 920, and 930 generated by scaling down, instead of shifting, the frames of the original image according to the control signals supplied to the first liquid crystal element 752 and the second liquid crystal element 754 may be output at a speed of 240 Hz.

According to an example embodiment, the frames 910, 920, and 930 generated by scaling down the original image may correspond to type 1 (or the output 807) of FIG. 8, and the frames 911, 921, and 931 generated by vertically and horizontally shifting the frames of the original image by ½ of a pixel size may correspond to type (2) (or the output 808) of FIG. 8. The frames 912, 922, 923 generated by horizontally shifting the frames of the original image by ½ of the pixel size may correspond to type (3) (or the output 809) of FIG. 8, and the frames 913, 923, and 933 generated by vertically shifting the frames of the original image by ½ of the pixel size may correspond to type (4) of (or the output 810) of FIG. 8.

According to an example embodiment, a frame that is generated by shifting the original image while passing through a transparent cover (e.g., the transparent cover 393 of FIG. 3) and a frame that is generated by scaling down, instead of shifting, the original image may be output at the speed of 240 Hz, even though the frames of the original image are output at the speed of 60 Hz, a self-luminous display (e.g., the self-luminous displays 361 and 362 of FIG. 3) may output an image with a resolution four times greater than a resolution of a micro LED (e.g., the micro LED 391 of FIG. 3). According to an example embodiment, a frame in which light output from the micro LED is not shifted, a frame in which the light output from the micro LED is vertically and horizontally shifted by ½ of the pixel size, a frame in which the light output from the micro LED is horizontally shifted by ½ of the pixel size, and a frame in which the light output from the micro LED is vertically shifted by ½ of the pixel size may be output in synchronization with each other to provide a virtual pixel according to the interpolation principle. Thus, an image with a resolution greater than that of the micro LED may be output.

FIGS. 10A, 10B, 10C, 10D, 10E and 10F are diagrams illustrating adjusted images that are generated by a wearable electronic device according to various embodiments.

According to an example embodiment, the wearable electronic device (e.g., the wearable electronic device 300 of FIG. 3) may output four adjusted images corresponding to a virtual object image through a self-luminous display and a transparent cover (e.g., the transparent cover 393 of FIG. 3). Here, positions of the four adjusted images may be adjusted to be different from a position of the virtual object image by sub-pixels in different directions.

Directions of the four adjusted images may include upper, lower, left and right directions, or upper right, lower right, upper left and lower left directions. However, this is merely an example, and the original image may be shifted in various directions to form a clear interpolated image.

The wearable electronic device may supply power or control signals to a first liquid crystal element and a second liquid crystal element at different periods through a first control circuit. A plurality of images separated through a first birefringent plate and a second birefringent plate may be converted into light having different polarization states through the first liquid crystal element and the second liquid crystal element. A polarizer may output the four adjusted images obtained by shifting the virtual object image in different directions from a plurality of rays.

The transparent cover may alternately output one or more adjusted images. By supplying the power or the control signals to the first liquid crystal element and the second liquid crystal element at different periods, the four adjusted images may flicker at different timings.

Referring to FIG. 10A, a self-luminous display 1021 may include a micro LED or an OLED. The self-luminous display 1021 may include a plurality of pixels. The self-luminous display 1021 may include a plurality of visible light pixels and a plurality of infrared pixels. The plurality of visible light pixels may include R, G, and B pixels. For example, the plurality of infrared pixels may be disposed at a position 1023 in the self-luminous display 1021.

Since it is impossible to detect infrared light with the human eye, defective pixels may appear in an output image due to infrared pixels disposed between visible light pixels. For example, a defective pixel 1033 corresponding to a position of an infrared pixel may appear in an output image 1031 output through the self-luminous display 1021 including the infrared pixels disposed between the visible light pixels. Accordingly, a user may experience a blurry output image.

Referring to FIG. 10B, the wearable electronic device may output four adjusted images by a sub-pixel shift 1040 in upper, lower, left and right directions. An adjusted image 1041 may be an image generated by shifting a virtual object image corresponding to all pixels of the self-luminous display 1021 to a right side. An adjusted image 1042 may be an image generated by shifting the virtual object image corresponding to all the pixels of the self-luminous display 1021 to a left side. An adjusted image 1043 may be an image generated by shifting upward the virtual object image corresponding to all the pixels of the self-luminous display 1021. An adjusted image 1044 may be an image generated by shifting downward the virtual object image corresponding to all the pixels of the self-luminous display 1021.

The four adjusted images 1041, 1042, 1043, and 1044 may flicker at different timings. For example, when the original image is output at a speed of 60 Hz, each of the four adjusted images 1041, 1042, 1043, and 1044 may be output at a speed of 240 Hz. Since the speed at which the four adjusted images 1041, 1042, 1043, and 1044 flicker is greater than a speed at which eyes may recognize, the four adjusted images 1041, 1042, 1043, and 1044 may be recognized as one interpolated image, e.g., an interpolated image 1045. A defective pixel may be offset in the interpolated image 1045, and the interpolated image 1045 may have a resolution greater than that of the original image.

Referring to FIG. 10C, the wearable electronic device may output four adjusted images by a sub-pixel shift 1050 in upper right, lower right, upper left and lower left directions. An adjusted image 1051 may be an image generated by shifting the virtual object image corresponding to all the pixels of the self-luminous display 1021 to an upper right side. An adjusted image 1052 may be an image obtained by shifting the virtual object image corresponding to all the pixels of the self-luminous display 1021 to a lower right side. An adjusted image 1053 may be an image obtained by shifting the virtual object image corresponding to all the pixels of the self-luminous display 1021 to an upper left side. An adjusted image 1054 may be an image obtained by shifting the virtual object image corresponding to all the pixels of the self-luminous display 1021 to a lower left side.

The four adjusted images 1051, 1052, 1053, and 1054 may flicker at different timings. For example, when the original image is output at a speed of 60 Hz, each of the four adjusted images 1051, 1052, 1053, and 1054 may be output at a speed of 240 Hz. Since the speed at which the four adjusted images 1051, 1052, 1053, and 1054 flicker is greater than a speed at which eyes may recognize, the four adjusted images 1051, 1052, 1053, and 1054 may be recognized as one interpolated image, e.g., an interpolated image 1055. A defective pixel may be offset in the interpolated image 1055, and the interpolated image 1055 may have a resolution greater than that of the original image.

Referring to FIG. 10D, when infrared pixels 1066 are vertically and linearly arranged in the self-luminous display 1021, the wearable electronic device may output two partially adjusted images through a sub-pixel shift 1060 in the left and right directions. The partially adjusted images may refer to adjusted images to generate an interpolated image only in a portion of the virtual object image corresponding to a defective pixel. When positions of the infrared pixels 1066 are known, the wearable electronic device may adjust a position of a portion of the virtual object image corresponding to visible light pixels around each infrared pixel and may output two partially adjusted images corresponding to each infrared pixel.

A partially adjusted image 1061 may be an image generated by shifting a portion of the virtual object image corresponding to an infrared pixel area included in the self-luminous display 1021 to the right side. A partially adjusted image 1062 may be an image generated by shifting the portion of the virtual object image corresponding to the infrared pixel area included in the self-luminous display 1021 to the left side.

The two partially adjusted images 1061 and 1062 may flicker at different timings. For example, when the original image is output at a speed of 60 Hz, each of the two partially adjusted images 1061 and 1062 may be output at a speed of 120 Hz. Since the speed at which the two partially adjusted images 1061 and 1062 flicker is greater than a speed at which eyes may recognize, the two partially adjusted images 1061 and 1062 may be recognized as one interpolated image, e.g., an interpolated image 1065. A defective pixel may be offset in the interpolated image 1065, and the interpolated image 1065 may have a resolution greater than that of the original image.

Referring to FIG. 10E, a self-luminous display 1025 may include a micro LED or an OLED. The self-luminous display 1025 may include a plurality of pixels. The self-luminous display 1025 may include a plurality of visible light pixels and a plurality of infrared pixels. The plurality of visible light pixels may include R, G, and B pixels. For example, the plurality of infrared pixels may be disposed at a position 1027 in the self-luminous display 1025.

Since it is impossible to detect infrared light with the human eye, defective pixels may appear in an output image due to infrared pixels disposed between visible light pixels. For example, a defective pixel 1037 corresponding to a position of an infrared pixel may appear in an output image 1035 output through the self-luminous display 1025 including the infrared pixels disposed between the visible light pixels. Accordingly, a user may experience a blurry output image.

Referring to FIG. 10F, when infrared pixels 1076 are horizontally and linearly arranged in the self-luminous display 1025 (e.g., as shown in FIG. 10E), the wearable electronic device may output two partially adjusted images through a sub-pixel shift 1070 in the upper and lower directions. The partially adjusted images may refer to adjusted images to generate an interpolated image only in a portion of the virtual object image corresponding to a defective pixel. When positions of the infrared pixels 1076 are known, the wearable electronic device may adjust a position of a portion of the virtual object image corresponding to visible light pixels around each infrared pixel and may output two partially adjusted images corresponding to each infrared pixel.

A partially adjusted image 1071 may be an image generated by shifting upward a portion of the virtual object image corresponding to an infrared pixel area included in the self-luminous display 1025. A partially adjusted image 1072 may be an image generated by shifting downward the portion of the virtual object image corresponding to the infrared pixel area included in the self-luminous display 1025.

The two partially adjusted images 1071 and 1072 may flicker at different timings. For example, when the original image is output at a speed of 60 Hz, each of the two partially adjusted images 1071 and 1072 may be output at a speed of 120 Hz. Since the speed at which the two partially adjusted images 1071 and 1072 flicker is greater than a speed at which eyes may recognize, the two partially adjusted images 1071 and 1072 may be recognized as one interpolated image, e.g., an interpolated image 1075. A defective pixel may be offset in the interpolated image 1075, and the interpolated image 1075 may have a resolution greater than that of the original image.

Figure 11A:
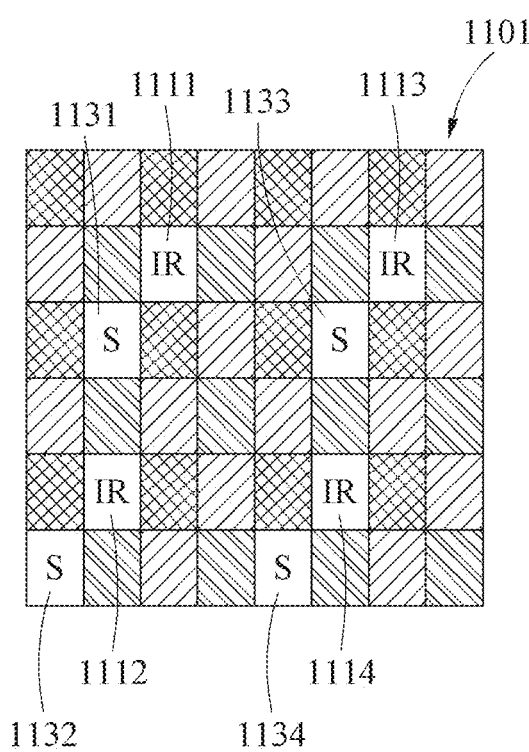
FIGS. 11A and 11B are diagrams illustrating an example distribution of infrared pixels included in a self-luminous display included in a wearable electronic device according to various embodiments.
Figure 11B:
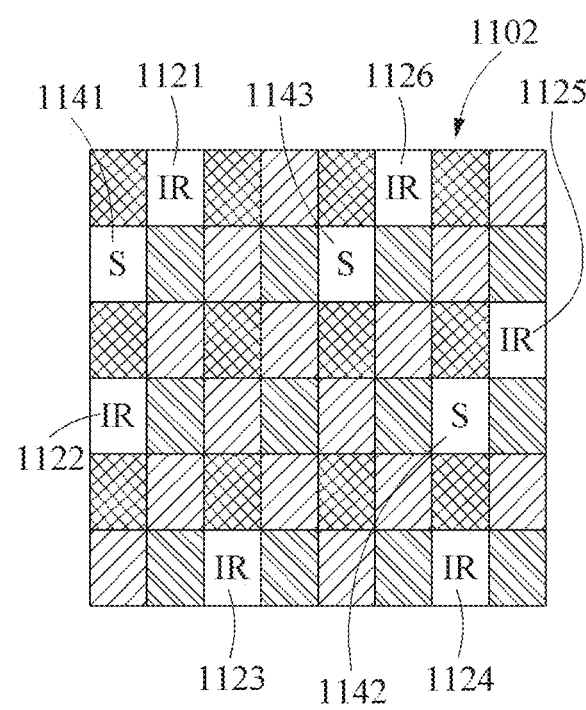

FIGS. 11A and 11B are diagrams illustrating an example distribution of infrared pixels included in a self-luminous display included in a wearable electronic device according to various embodiments.

The self-luminous displays (e.g., the self-luminous displays 361 and 362 of FIG. 3) may include a plurality of visible light pixels and a plurality of infrared pixels. The plurality of infrared pixels may be arranged in various patterns in the self-luminous display. For example, the plurality of infrared pixels may be linearly and vertically arranged or may be horizontally arranged. The plurality of infrared pixels may be linearly and diagonally arranged.

Referring to FIG. 11A, in an example embodiment, a plurality of infrared pixels 1111, 1112, 1113, and 1114 may be randomly arranged in a self-luminous display 1101. The plurality of infrared pixels 1111, 1112, 1113, and 1114 may be randomly arranged in an area of the self-luminous display 1101 corresponding to an iris of a user. The above arrangement pattern may be relatively easily used for gaze tracking in comparison to a linear pattern. In an example embodiment, the self-luminous display 1101 may further include a plurality of gaze tracking sensors 1131, 1132, 1133, and 1134. The plurality of gaze tracking sensors 1131, 1132, 1133, and 1134 may be arranged in a unique pattern, or may be randomly arranged similarly to the plurality of infrared pixels 1111, 1112, 1113, and 1114. The plurality of gaze tracking sensors 1131, 1132, 1133, and 1134 may detect infrared light that is obtained by reflecting, by an eye of a user, light emitted by the plurality of infrared pixels 1111, 1112, 1113, and 1114.

Referring to FIG. 11B, a plurality of infrared pixels 1121, 1122, 1123, 1124, 1125, and 1126 may be arranged in a circular form in a self-luminous display 1102. The plurality of infrared pixels 1121, 1122, 1123, 1124, 1125, and 1126 may be arranged in the circular form in an area of the self-luminous display 1102 corresponding to an edge of an iris of the user. The above arrangement pattern may be relatively easily used for gaze tracking in comparison to a linear pattern. In an example embodiment, the self-luminous display 1102 may further include a plurality of gaze tracking sensors 1141, 1142, and 1143. The plurality of gaze tracking sensors 1141, 1142, and 1143 may be arranged in a unique pattern, or may be randomly arranged similarly to the plurality of infrared pixels 1121, 1122, 1123, 1124, 1125, and 1126. The plurality of gaze tracking sensors 1141, 1142, and 1143 may detect infrared light that is generated by reflecting, by an eye of a user, light emitted by the plurality of infrared pixels 1121, 1122, 1123, 1124, 1125, and 1126.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A wearable electronic device comprising:
  a stereo camera configured to detect infrared light; a self-luminous display comprising a plurality of visible light pixels configured to output visible light corresponding to a virtual object image and a plurality of infrared pixels configured to output infrared light;
  an optical waveguide configured to output the virtual object image by adjusting a path of the visible light;
  a transparent cover disposed on the self-luminous display, the transparent cover comprising at least one birefringent plate, at least one liquid crystal element comprising a liquid crystal, and a polarizer;
  a first control circuit configured to supply driving power and a control signal to the self-luminous display; and
  a second control circuit configured to supply driving power and a control signal to the stereo camera,
  wherein the optical waveguide comprises a half mirror configured to output reflected infrared light and transmitted infrared light in response to the output infrared light;
  wherein the optical waveguide is disposed on the transparent cover, the first control circuit is configured to supply driving power and a control signal to the at least one liquid crystal element, and the transparent cover is configured to output a plurality of adjusted image corresponding to the virtual object image by adjusting a position of the virtual light at different timings, in different directions, and that are synchronized with each other to provide an interpolated image.

2. The wearable electronic device of claim 1, wherein the half mirror comprises a grating structure, and
the grating structure is configured to: reflect a portion of the output infrared light to output the reflected infrared light, and transmit another portion of the output infrared light to output the transmitted infrared light.

3. The wearable electronic device of claim 1, further comprising:
a control lens configured to adjust an angle of view of the transmitted infrared light.

4. The wearable electronic device of claim 1, wherein the optical waveguide comprises an input optical member and an output optical member, and
the input optical member comprises the half mirror and a control lens disposed on the half mirror.

5. The wearable electronic device of claim 1, further comprising:
a gaze tracking sensor configured to detect first reflected light generated by reflecting the reflected infrared light from an eye of a user,
wherein the second control circuit is configured to track a gaze of the user based on a detection result of the gaze tracking sensor.

6. The wearable electronic device of claim 1, wherein the stereo camera is configured to detect second reflected light generated by reflecting the transmitted infrared light from a real object, and
the second control circuit is configured to estimate a distance to the real object based on a detection result of the stereo camera.

7. The wearable electronic device of claim 6, wherein the second control circuit is configured to generate a distance image indicating the estimated distance, and to generate a composite image by synthesizing the distance image and the virtual object image.

8. The wearable electronic device of claim 1, wherein the first control circuit is configured to control an output of the infrared light by adjusting driving power of the infrared pixels.

9. A wearable electronic device comprising:
a self-luminous display comprising a plurality of visible light pixels configured to output visible light corresponding to a virtual object image and a plurality of infrared pixels configured to output infrared light;
a transparent cover disposed on the self-luminous display, the transparent cover comprising at least one birefringent plate, at least one liquid crystal element comprising liquid crystal, and a polarizer;
an optical waveguide disposed on the transparent cover and configured to output the virtual object image by adjusting a path of the visible light; and
a first control circuit configured to supply driving power and a control signal to at least one of the self-luminous display and the at least one liquid crystal element,
wherein the transparent cover is configured to output a plurality of adjusted image corresponding to the virtual object image by adjusting a position of the virtual light at different timings, in different directions, and that are synchronized with each other to provide an interpolated image.

10. The wearable electronic device of claim 9, wherein the transparent cover is configured to output four adjusted images corresponding to the virtual object image, and
wherein positions of the four adjusted images are different from a position of the virtual object image by sub pixels in different directions.

11. The wearable electronic device of claim 9, wherein the transparent cover is configured to output four partially adjusted images corresponding to each of the plurality of infrared pixels by adjusting a position of a portion of the virtual object image corresponding to a virtual light pixel around each of the plurality of infrared pixels, and
wherein positions of the four partially adjusted images are different from the position of the portion of the virtual object image by sub pixels in different directions.

12. The wearable electronic device of claim 9, wherein the first control circuit is configured to supply power to the at least one liquid crystal element at different periods, and
the transparent cover is configured to alternately output the at least one adjusted image.

13. The wearable electronic device of claim 9, wherein the plurality of infrared pixels are randomly arranged in the self-luminous display.

14. The wearable electronic device of claim 9, further comprising:
a stereo camera configured to detect infrared light reflected from a real object by transmitted infrared light output by the plurality of infrared pixels,
wherein the optical waveguide comprises a half mirror configured to output reflected infrared light and the transmitted infrared light in response to infrared light output from the infrared pixels.

15. The wearable electronic device of claim 14, further comprising:
a second control circuit configured to estimate a distance to the real object based on a detection result of the stereo camera.

16. The wearable electronic device of claim 9, wherein the plurality of infrared pixels are disposed in a circular arrangement in the self-luminous display.

17. The wearable electronic device of claim 9, wherein an area of the transparent cover substantially overlaps an area of the self-luminous display in which the plurality of infrared pixels are disposed.

18. The wearable electronic device of claim 9, wherein the transparent cover comprises:
a first birefringent plate;
a first liquid crystal element comprising liquid crystal disposed on the first birefringent plate;
a second birefringent plate disposed on the first liquid crystal element;
a second liquid crystal element comprising liquid crystal disposed on the second birefringent plate; and
a polarizing plate.

19. The wearable electronic device of claim 10, wherein the different directions comprise upper, lower, left and right directions, or upper right, lower right, upper left and lower left directions.

* * * * *